United States Patent [19]

Tajima et al.

[11] Patent Number: 4,860,417

[45] **Date of Patent: * Aug. 29, 1989**

[54] DEVELOPER CARRIER

[75] Inventors: Shoji Tajima, Higashikana; Yasuo Kadomatsu, Yokohama; Yoshio Miyazaki, Funabashi; Michikazu Sakurai, Yokohama; Kimio Anze, Kawasaki, all of Japan

[73] Assignee: Ricoh Co., Ltd., Tokyo, Japan

[ * ] Notice: The portion of the term of this patent subsequent to May 13, 2003 has been disclaimed.

[21] Appl. No.: 98,392

[22] Filed: Sep. 18, 1987

Related U.S. Application Data

[62] Division of Ser. No. 654,257, Sep. 25, 1984, Pat. No. 4,707,382.

[30] Foreign Application Priority Data

| | | | |
|---|---|---|---|
| Sep. 28, 1983 | [JP] | Japan | 58-178286 |
| Sep. 28, 1983 | [JP] | Japan | 58-178287 |
| Sep. 28, 1983 | [JP] | Japan | 58-178288 |
| Oct. 5, 1983 | [JP] | Japan | 58-185122 |
| Oct. 11, 1983 | [JP] | Japan | 58-188308 |
| Dec. 13, 1983 | [JP] | Japan | 58-233488 |
| Dec. 13, 1983 | [JP] | Japan | 58-233489 |
| Dec. 26, 1983 | [JP] | Japan | 58-244340 |
| Dec. 26, 1983 | [JP] | Japan | 58-244341 |

[51] Int. Cl.[4] .............................................. F16C 13/00

[52] U.S. Cl. ........................................ 29/130; 427/26; 29/132

[58] Field of Search ......................... 29/132, 130, 115; 428/328, 336, 463, 469, 693, 900, 926; 427/26

[56] References Cited

U.S. PATENT DOCUMENTS

| | | | |
|---|---|---|---|
| 4,011,362 | 3/1977 | Stewart | 29/132 X |
| 4,101,686 | 7/1978 | Strella et al. | 29/132 X |
| 4,142,281 | 3/1979 | Müller | 29/132 X |
| 4,146,659 | 3/1979 | Swift et al. | 29/132 X |
| 4,309,803 | 1/1982 | Blaszak | 29/132 X |
| 4,425,382 | 1/1984 | Tajima | 29/130 X |
| 4,430,406 | 2/1984 | Newkirk et al. | 29/130 X |
| 4,587,699 | 5/1986 | Kadomatsu et al. | 29/130 X |

*Primary Examiner*—Howard N. Goldberg
*Assistant Examiner*—Irene Cuda
*Attorney, Agent, or Firm*—Oblon, Spivak, McClelland, Maier & Neustadt

[57] ABSTRACT

A developer carrier to be formed is provided with a electrode layer which includes a plurality of electrode particles embedded in a dielectric material as electrically isolated from one another and exposed at an outer surface at least partly. In one aspect of the present invention, an underlying layer is first formed on a support and then an electrode layer is formed on the underlying layer. In forming the electrode layer, a first layer of first dielectric, adhesive layer is formed on the underlying layer and, after application of a plurality of electrode particles on the first layer, a second layer of second dielectric, adhesive layer is formed on the first layer and the electrode particles to define a to-be-formed electrode layer, whose outer surface is processed to have said electrode particles exposed at the processed outer surface thereby defining the electrode layer. In another aspect, there is provided a developer carrier having the underlying layer which includes an elastomer and a magnetic material. Also provided is a developer carrier which further includes an intermediate dielectric layer as sandwiched between the underlying and electrode layers. Various method for manufacturing such elastomer-containing developer carriers are also provided.

10 Claims, 28 Drawing Sheets

DEVELOPER CARRIER

This is a division, of application Ser. No. 06/654,257, filed Sept. 25 1984, now U.S. Pat. No. 4,707,382 .

BACKGROUND OF THE INVENTION

1. Field of the Invention

This invention generally relates to a developing device for developing a latent image, such as an electrostatic latent image, by application of a thin film of developer thereto for use in image processing machines, such as electrophotographic copiers, facsimile machines and printers. In particular, the present invention relates to a developer carrier for use in such a developing device for transporting the developer, typically toner, as carried thereon through a developing station where the latent image is developed and a method for manufacturing the same. More specifically, the present invention relates to a developer carrier suitable for use in a developing device employing magnetically attractable, electrically insulating toner as a developer and a method for manufacturing such a developer carrier.

2. Description of the Prior Art

In electrostatic recording machines, such as electrophotographic copiers, facsimiles and printers, the developing characteristics required for developing devices differ between the case in which an image to be developed mainly consists of a line image and the case in which an image to be developed mainly consists of an area image. The ideal developing characteristics are shown graphically in FIG. 1, in which the abscissa is taken for original image density and the ordinate is taken for copy image density. As shown in FIG. 1, the ideal developing characteristic required for developing an area image is indicated by a solid line A, while the ideal developing characteristic for a line image is indicated by a dotted line B. It may be seen that the rising slope is steeper for the case of line image (dotted line B) as compared with the case of area image (solid line A). The reason for this is that in the case of an area image, since sharpness of a developed image deteriorates if the original image density is lower, it is necessary to compensate for this by increasing the copy image density, whereas, in the case of an area image, sufficient sharpness may be obtained if the image density of a developed image is proportional to the image density of the original image.

It is common practice to utilize the so-called edge effect in order to attain an increased image density of a copy image for an original mainly consisting of a line image having a relatively lower image density. That is, with such an edge effect, the strength of electric field at the periphery of an electrostatic latent image is locally increased as compared with the strength of electric field at the central region of the latent image so that more toner may be deposited to the peripheral portion of the latent image. Thus, in the case where the latent image is a line image having a small or narrow area, the area of the latent image is substantially comprised of the peripheral portion which is subjected to the edge effect, thereby allowing to increase the image density of resultant developed image. The edge effect is sufficiently produced if use is made of the so-called two component developer containing toner and iron powder; however, the edge effect cannot be produced effectively in the case where use is made of a so-called single component developer comprised of magnetic toner and containing no iron powder.

Under the circumstances, there has been proposed a novel developing device including a developer carrier having a unique structure capable of producing the above-described ideal developing characteristics even if use is made a single component developer as disclosed in the Japanese Patent Application, No. 55-185726, assigned to the assignee of this application. The developer carrier disclosed in the above-noted patent application is schematically shown in FIG. 2 of this application and it comprises a cylindrical support 1 of electrically conductive material and an electrode layer 2 which is formed on the outer peripheral surface of the cylindrical support 1 from an electrically insulating material with a plurality of fine electrode particles **2*a* semispherical in shape being provided at the outer surface of the electrode layer 2 as uniformly dispersed axially as well as circumferentially, said individual electrode particles 2*a* being isolated from one another and maintained electrically floated. When the developer carrier shown in FIG. 2 is to be used as incorporated in a developing device employing a single component developer or magnetic toner, a magnet roller (not shown) is typically provided in an internal space 3 of the cylindrical support 1. With this arrangement, a magnetic field produced by the magnetic roller causes the magnetic toner to be attracted to the outer surface of the electrode layer 2**.

FIGS. **3*a* and 3*b* show schematically how the developer carrier of FIG. 2 is effective in causing the edge effect to increase the image density of a line image when developed. In FIGS. 3*a* and 3*b* is shown a portion of a developer carrier 32, which structurally corresponds to the developer carrier shown in FIG. 2, as disposed opposite to a portion of a photosensitive member 31 on which a latent image (line image $L_1$ in FIG. 3*a* and area image $L_2$ in FIG. 3*b*) is defined by the positive charge. The photosensitive member 31 includes an electrically conductive substrate 31*a* and a photoconductive layer 31*b* formed thereon and like numerals are used for the elements of the developer carrier 32 to identify like elements of the developer carrier shown in FIG. 2. It is to be noted that, in fact, a layer of negatively charged magnetic toner should be present as formed on the surface of the electrode layer 2 of the developer carrier 32, this has been eliminated from these figures for the sake of simplicity. As indicated earlier, there are defined line and area latent images $L_1$ and $L_2$ at the outer surface of the photoconductive layer 31*b*, for example, from the positive charge, as shown in FIGS. 3*a* and 3*b***, respectively.

As may be easily understood, a layer of magnetic toner (not shown) carried on the developer carrier 32 is selectively transferred to the photosensitive member according to the charge pattern defined by the latent image $L_1$, $L_2$ so that the latent image $L_1$, $L_2$ is developed into a visible image. In this instance, the amount of toner deposition the latent image depends on the strength of an electric field present in the vicinity of the surface of photoconductive layer **31*b* so that the higher the strength of this electric field, the more the amount of deposition of toner to the latent image, thereby providing an increased image density in a developed image. Under the circumstances, in the case where the electrostatic latent image is a line image as shown in FIG. 3*a*, the strength of the electric field at the surface of the photosensitive member 31 where the line latent image $L_1$ is formed is increased so that the amount of toner deposited to the latent image $L_1$ becomes increased, thereby allowing to increase the image density of developed image, as compared with the case in which the electrode particles 2***a* are absent. The reason for this is that the provision of the electrode particles 2*a* causes the effective dielectric thickness between the line latent image $L_1$ and its surrounding background portion to be thinner thereby increasing the number of electric force lines directed from the latent image $L_1$ toward the surrounding background portion.

On the other hand, in the case where the electrostatic latent image is an area image as shown in FIG. 3*b*, the overall strength of electric field at the surface where the area latent image $L_2$ is formed is not appreciably increased so that no significant changes in developing characteristic is produced due to the presence of the electrode particles 2*a*. In this case, the electric force lines directed from the latent image $L_2$ to the conductive support 1 remain substantially unchanged with the presence of the electrode particles 2*a* excepting at the peripheral portion of the latent image $L_2$ because the effective dielectric thickness is larger between the central portion of the latent image $L_2$ and its surrounding background portion than between the latent image $L_2$ and the conductive support 1. It should thus be apparent that the ideal developing characteristics shown in FIG. 1 may be obtained by using the developer carrier shown in FIG. 2.

However, difficulty has been encountered in manufacturing the developer carrier shown in FIG. 2, particularly in arranging the electrode particles 2*a* at the outer surface of the electrode layer 2. There has thus been necessity to develop novel structures and methods for manufacturing such structures with ease as well as at high accuracy.

SUMMARY OF THE INVENTION

It is therefore a primary object of the present invention to provide a novel developer carrier for use in a developing device and an improved method for manufacturing a developer carrier.

Other objects, advantages and novel features of the present invention will become apparent from the following detailed description of the invention when considered in conjunction with the accompanying drawings.

BRIEF DESCRIPTION OF THE DRAWINGS

FIG. 22 is a longitudinal, cross-sectional view showing a step of hardening the second adhesive agent by application of heat thereto after formation of the covering layer of the second adhesive agent which covers the electrode particles 2a;

DESCRIPTION OF THE PREFERRED EMBODIMENTS

Figure 1:
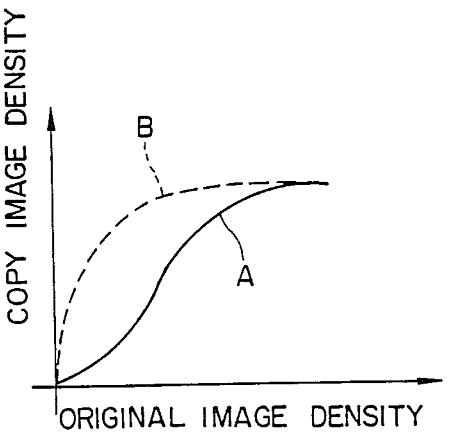
FIG. 1 is a graph showing the ideal developing characteristics for developing a latent image.
Figure 2:
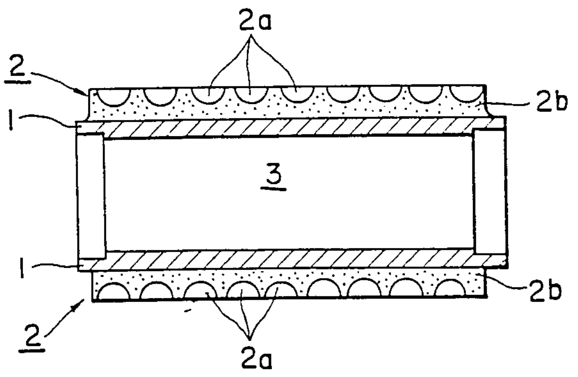
Fig. 2 Prior Art
FIG. 2 is a cross-sectional view schematically showing the structure of a prior art developer carrier capable of producing the ideal developing characteristics shown graphically in FIG. 1.
Figure 3A:
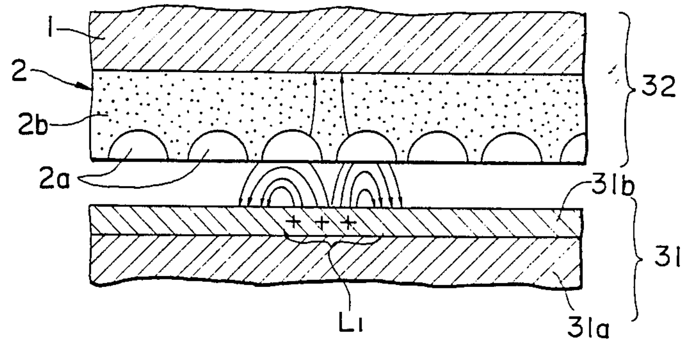
FIGS. 3*a* and 3*b* are schematic illustrations which are useful for explaining the developing operation for developing line and area latent images, respectively, using the developer carrier shown in FIG. 2.
Figure 3B:
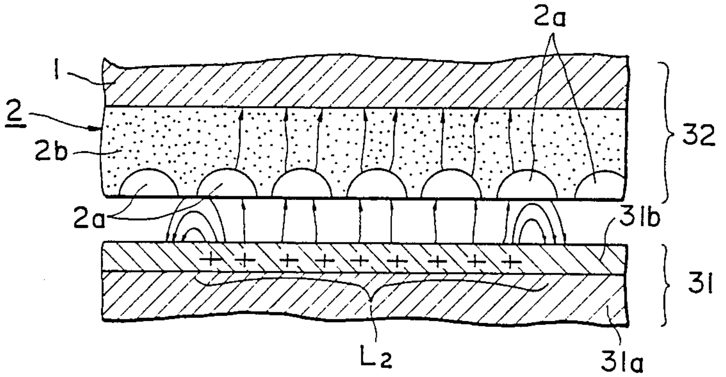
Figure 4:
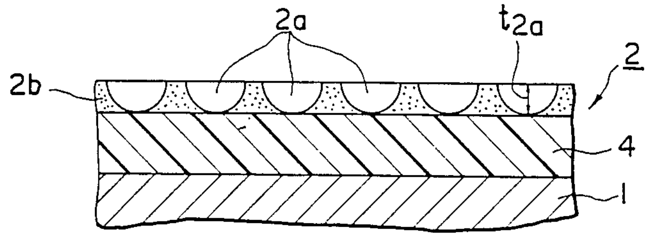
FIG. 4 is a fragmentary cross-sectional view showing the structure of a novel developer carrier constructed in accordance with one embodiment of the present invention.

Now, referring to the accompanying drawings, the present invention will be described in detail by way of specific embodiments. FIG. 4 shows the structure of a developer carrier to be constructed in accordance with the present invention, and, as shown, the developer carrier comprises a substrate or support 1, typically cylindrically shaped, of electrically conductive material, a dielectric layer 4 of predetermined thickness formed on the support 1 and an electrode layer 2 formed on the dielectric layer 4 with a plurality of electrode particles arranged at the outer surface isolated from one another in an electrically floating condition. It is to be noted that the developer carrier of FIG. 4 is featured in the provision of a specific dielectric layer 4 as an intervening layer having a predetermined thickness between the support 1 and the electrode layer 2.

Figure 5:
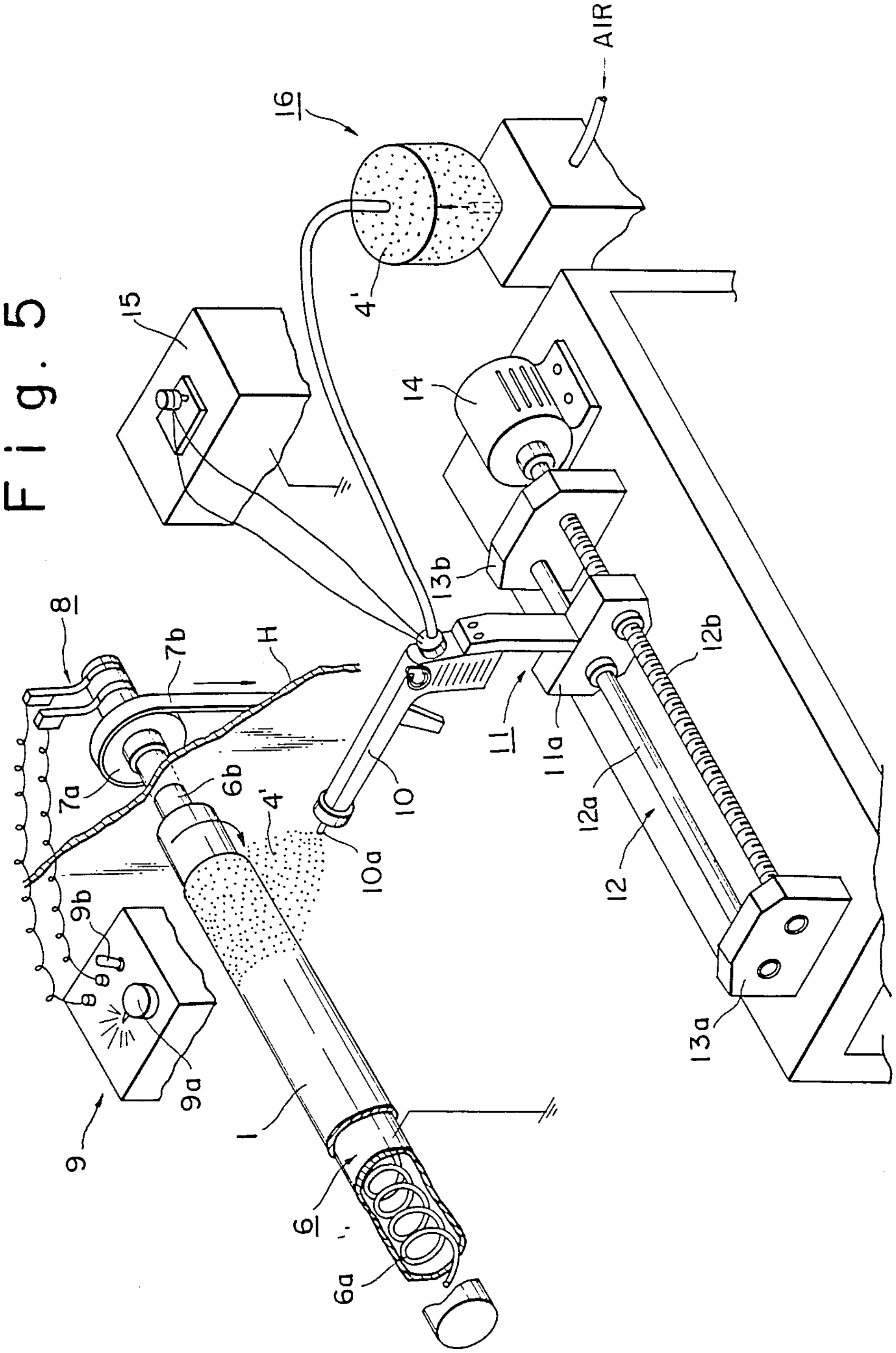
FIG. 5 is a perspective view illustrating the overall structure of a system for applying dielectric powder to form a dielectric layer 4' on a cylindrical substrate 1 as one of the sequence of steps in one embodiment of the present manufacturing method.

In the first place, as shown in FIG. 5, there is prepared a cylindrical support of electrically conductive material. If the developer carrier to be manufactured is to be used in a developing device employing magnetic toner as a developer and a magnet is used to have the magnetic toner attracted to the developer carrier, the cylindrical support 1 is made from a non-magnetic material, such as stainless steel, to be relatively thin in thickness.

Then, upon subjecting the outer peripheral surface of the cylindrical support 1 to degreasing treatment, there is formed a layer of dielectric material uniformly across the entire outer peripheral surface of the cylindrical support 1, preferably, according to the electrostatic spraying method. A system for spraying dielectric powder for formation of a dielectric layer on the cylindrical support 1 shown in FIG. 5 includes a sheathed heater 6 which is comprised of a sheath of electrically conductive material and connected to ground and a spiral heater 6a housed in the sheath and which is rotatably supported by a side wall H of a spraying booth to extend horizontally within the booth. The sheathed heater 6 is connected to a rotating shaft 6b on which is fixedly mounted a pulley 7a, which, in turn, is operatively coupled to a driving motor (not shown) through an endless belt 7b, so that the sheathed heater 6 may be driven to rotate at constant speed in a desired direction. On the rotating shaft 6b is also provided a pair of contact rings at the side opposite to the side where the sheeted heater 6 is provided with respect to the pulley 7a, and the pair of contact rings connected to the ends of the helical heater 6a in sliding contact with a pair of contact springs 8 is electrically connected to a power supply control unit 9 provided with a temperature controller (not shown), a temperature setting knob 9a and an on/-off switch 9b. Thus, when current flows through the heater 6a under control, the cylindrical support 1 fitted onto the sheathed heater 6 may be heated to a predetermined temperature, or 180° C. in the preferred embodiment of the present invention.

Also provided is a spray gun 10 which is directed to spray dielectric powder 4' toward the cylindrical support 1 fitted onto the sheathed heater 6 according to the electrostatic spray method and which is mounted on a holder 11 which moves in parallel with the sheathed heater 6 in a reciprocating manner. The holder 11 is formed integrally with a carriage 11a through which extends a pair of shafts 12, one of which is a guide shaft 12a having a smooth surface and the other of which is a driving shaft 12b having a male thread in mesh with a female thread formed in a hole of the carriage 11a. The pair of shafts 12 is supported by a pair of blocks at their ends, and the driving shaft 12b is rotatably supported with its one end coupled to a reversibly rotatable motor 14. Thus, the spray gun 10 may be driven to move either to the right or to the left depending on the direction of rotation of the driving motor 14.

Furthermore, the spray gun 10 is electrically connected to a high voltage generator 15 through conductors and fluid dynamically connected to a powder suspension system 16 through a tube. In the powder suspension system 16, dielectric powder 4' to be sprayed is suspended in air under pressure and supplied to the spray gun 10.

With the spray system shown in FIG. 5, the cylindrical support 1 is first fitted onto the sheathed heater 6 to be located at a predetermined position, and then the sheathed heater 6 is driven to rotate at a predetermined speed as driven by a motor (not shown) through the driving belt 7b and at the same time the temperature setting knob 9a is set at a desired temperature, e.g., 180° C. in the preferred embodiment of the present invention, with the switch 9b turned on. After confirming that the cylindrical support 1 has been heated to the predetermined level, electrostatic spraying of dielectric powder 4' by means of the spray gun 10 is initiated. In the illustrated system, the dielectric powder 4' is supplied to the spray gun 10 as suspended in compressed air and the flow of air with a suspension of dielectric powder 4' is directed toward the cylindrical support 1 on the sheathed heater 6. Since the high voltage generator 15 is connected to an electrode (not shown) provided in the spray gun in the vicinity of a nozzle 10a, the dielectric powder 4' comes to be charged when discharged out of the spray gun 10. The dielectric powder 4' thus charged and discharged then follows an electrostatic field defined between the spray gun 10 and the sheathed heater 6 to be deposited onto the outer peripheral surface of the cylindrical support 1 thereby forming a dielectric layer uniformly along the entire length thereof.

Described more in detail in this respect, in the preferred embodiment of the present invention, while the spray gun 10 is driven to move along the shafts 12 at constant speed in a reciprocating manner by reversibly driving to rotate the motor 14, the dielectric powder 4' of epoxy resin charged to a predetermined polarity is sprayed toward the cylindrical support 1 in rotation. The dielectric powder 4' thus sprayed is then deposited onto the cylindrical support 1 as electrostatically attracted thereto, and, since the cylindrical support 1 is at an elevated temperature, e.g., at 180° C., the dielectric powder 4' melts as soon as it is deposited thereon. During this step the cylindrical support 1 rotates around its longitudinal axis as maintained horizontally so that a dielectric layer of approximately 0.5 mm thick may be formed substantially uniformly along the entire length of the cylindrical support 1 as the dielectric powder 4' is repetitively applied to the cylindrical support 1 to be adhered thereto by melting.

When the thickness of the dielectric layer being formed on the outer peripheral surface of the cylindrical support 1 has reached a predetermined level, the spraying of dielectric powder 4' is terminated; however, the sheathed heater 6 is maintained in operation in heating and rotation continuously for an appropriate time period thereby causing the dielectric layer formed on the cylindrical support 1 to harden sufficiently. This allows to insure the formation of a dielectric layer uniform in thickness circumferentially as well as longitudinally because the melted dielectric material is prevented from flowing downward along the surface of the cylindrical support 1 due to gravity.

Figure 6A:
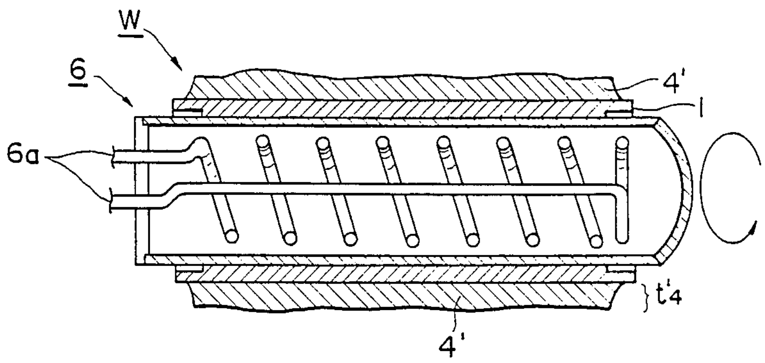
FIG. 6*a* is a longitudinal, cross-sectional view showing a step of hardening the dielectric layer 4' formed at the of FIG. 5.
Figure 6B:
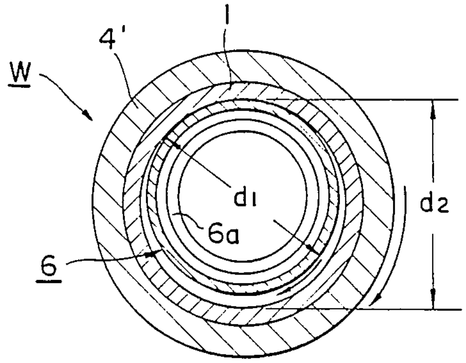
FIG. 6*b* a transverse, cross-sectional view showing a modification of the step shown in FIG. 6*a;*

In the preferred embodiment of the present invention as shown in FIG. 6b, it is so set that the outer diameter $d_1$ of the sheathed heater 6 is smaller than the inner diameter $d_2$ of the cylindrical support 1 to the extent that the cylindrical support 1 does not rotate in unison with the sheathed heater 6. That is, with this structure, the cylindrical support 1 is in line contact with the sheathed heater 6 and the portion of the cylindrical support 1 which is in line contact with the sheathed heater 6 gradually moves along the circumference of the cylindrical support 1 because of a difference in angular velocity between the cylindrical support 1 and the sheathed heater 6. Such a structure is advantageous in that the cylindrical support 1 may be heated more uniformly across its entire surface thereby insuring the formation of a dielectric layer more uniform in thickness and property on the cylindrical support 1. It is to be noted further that the cylindrical support 1 may be mounted onto and dismounted from the sheathed heater 6 more easily in such a structure.

Figure 7:
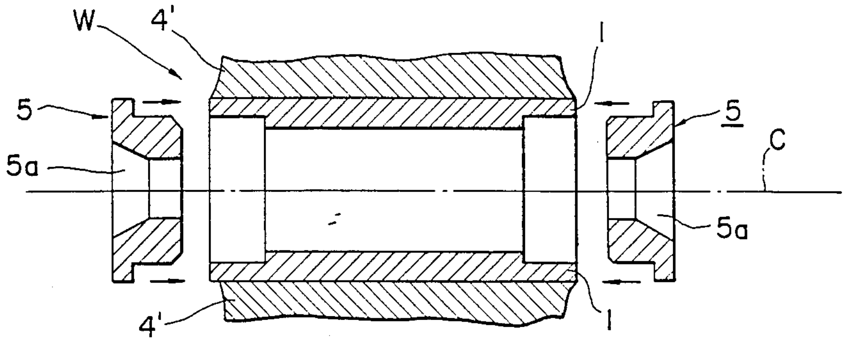
FIG. 7 is a longitudinal, cross-sectional view showing a step of inserting centering fittings to both ends of the cylindrical substrate 1.
Figure 8:
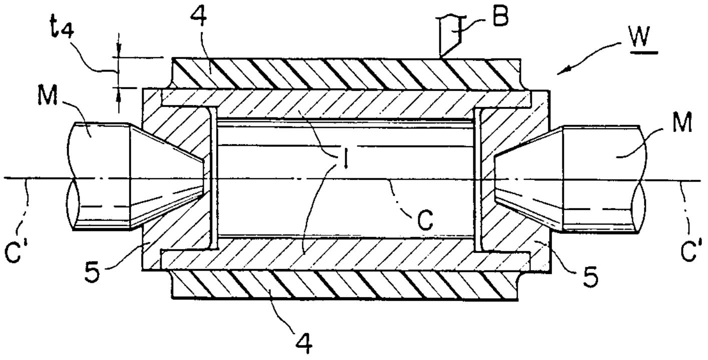
FIG. 8 is a longitudinal, cross-sectional view showing a step of cutting the outer peripheral surface of the dielectric layer 4 is supported by a pair of mandrels M, M.

Then, the outer peripheral surface of the dielectric layer 4' formed on the cylindrical support 1 is processed to define a dielectric layer having a predetermined thickness, or 0.4 mm in the preferred embodiment of the present invention, and a smooth outer peripheral surface. In the present embodiment, as shown in FIG. 7, use is made of a pair of centering fittings 5, 5, each of which is provided with a tapered center hole 5a. These centering fittings 5, 5 are press-fitted into the cylindrical support 1 on both ends. Then, as shown in FIG. 8, the cylindrical support 1 with the pair of centering fittings 5, 5 snugly fitted at its both ends is rotatably held between a pair of mandrels M, M, for example, of a lathe. Under the condition, the cylindrical support 1 is driven to rotate around a rotating axis C'—C' and the outer surface of the dielectric layer 4' is cut by a cutting tool B by moving it along the rotating axis C'—C'. It is to be noted that the center axis C of the cylindrical support 1 may be easily and securely aligned with the rotating axis C'—C' defined by the pair of mandrels M, M through engagement between the mandrel M and the centering fitting 5 at each end of the cylindrical support 1. Thus, the dielectric layer 4' may be accurately processed into a dielectric layer 4 having the thickness t4 of 0.4 mm. Such processing may also be carried out by any other suitable methods as will be described later.

Figure 9:
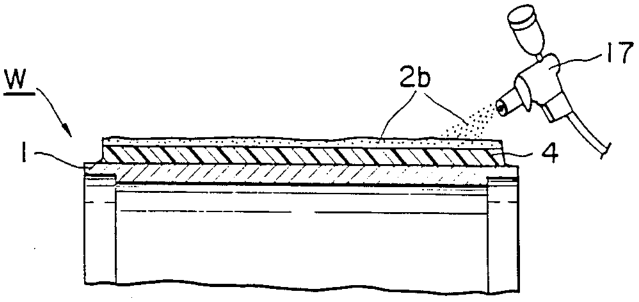
FIG. 9 is a schematic illustration showing a step of applying an adhesive agent 2*b* onto the processed outer peripheral surface of the dielectric layer 4.
Figure 10:
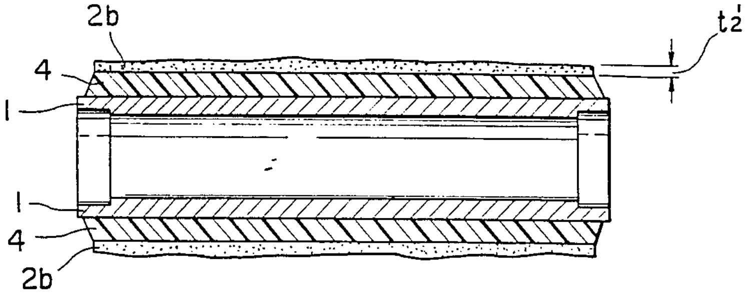
FIG. 10 is a longitudinal, cross-sectional view showing the structure after application of the adhesive agent to the outer peripheral surface of the dielectric layer 4.

After processing of the dielectric layer 4 by the cutting tool B, the outer surface of the dielectric layer 4 is cleaned, and, then, as shown in FIG. 9, an adhesive agent 2b of a dielectric material which hardens at a relatively low temperature, e.g., room temperature, such as acrylic urethane, is uniformly applied to the outer surface of the dielectric layer 4, for example, by means of a spray-type applicator 17. Thus, there is formed a film 2b of adhesive agent 2b on the dielectric layer 4 as shown in FIG. 10, and the average thickness $t_2'$ of this adhesive agent film 2b is controlled such that all of electrode particles having the diameter ranging from 74 to 104 microns to be applied in the next following step may come into contact with the outer peripheral surface of the dielectric layer 4 when applied onto the film of adhesive agent 2b. In the present embodiment, this thickness $t_2'$ is preferably ranged between 4 and 5 microns. It is of course preferable to apply the adhesive agent 2b onto the dielectric layer 4 repetitively while keeping the cylindrical support 1 in rotation as held horizontally with the applicator 17 moved along the longitudinal axis of the cylindrical support 1.

Figure 11:
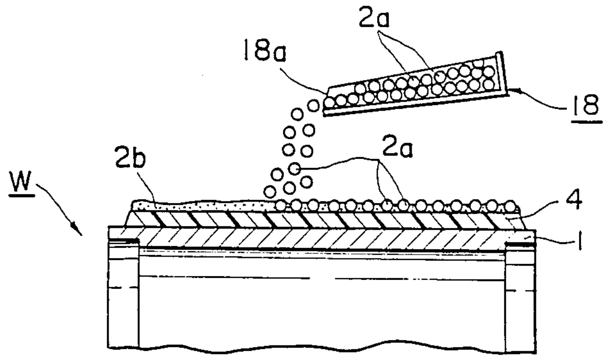
FIG. 11 is a schematic illustration showing a step of applying electrode particles 2*a* onto the adhesive agent 2*b;*
Figure 12:
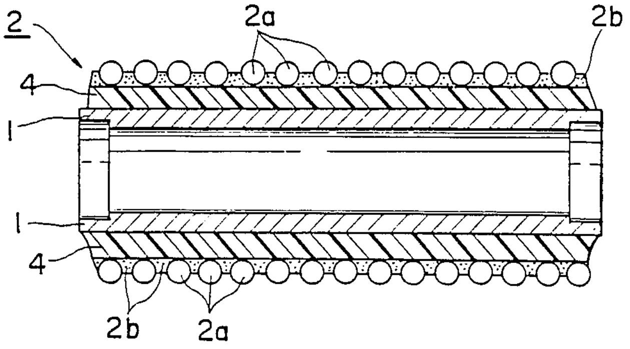
FIG. 12 is a longitudinal, cross-sectional view showing the structure after application of the electrode particles 2*a* onto the adhesive agent 2*b;*

As soon as the film of adhesive agent 2b has been formed and before it hardens, a number of electrode particles 2a are applied uniformly to the film of adhesive agent 2b as shown in FIG. 11 until the electrode particles 2a are deposited uniformly across the entire surface in contact with the dielectric layer 4, as shown in FIG. 12. In the illustrated embodiment, the electrode particles 2a of copper having the diameter approximately ranging from 74 to 104 microns are stored in a container 18 having a supply opening 18a and the container 18 is moved as inclined along the longitudinal axis of the cylindrical support 1 in a reciprocating manner with the cylindrical support 1 in rotation around its longitudinal axis, so that the electrode particles 2a may distribute uniformly across the entire surface. As will be described more in detail later, each of the electrode particles 2a is previously coated with a dielectric coating material, such as acrylic lacquer, so that even if the electrode particles 2a are randomly deposited onto the layer of adhesive agent 2b as falling under the influence of gravity, the deposited electrode particles 2a may be maintained electrically isolated from one another. Moreover, since the thickness of the film of adhesive agent 2b is relatively thin, ranging between 4 and 5 microns, the electrode particles 2a of copper having the diameter of 74 to 104 microns do not stay on the film of adhesive agent 2b but come into contact with the dielectric layer 4 due to their own weight. Although copper is used in the present embodiment, any other electrically conductive material, such as bronze, phosphor bronze and stainless steel, may also be used as a material for forming the electrode particles.

Figure 13:
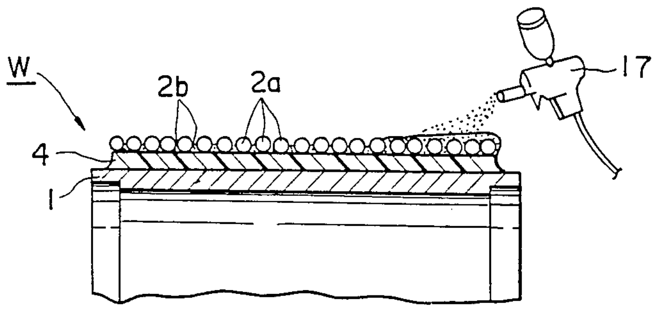
FIG. 13 is a schematic illustration showing a step of applying the adhesive agent to cover the electrode particles 2*a;*
Figure 14:
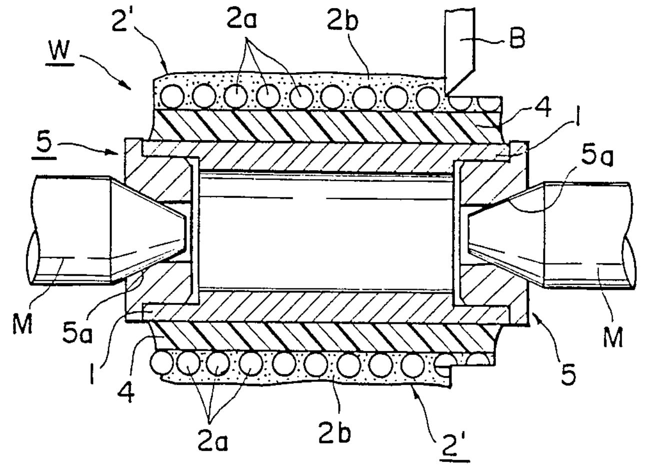
FIG. 14 is a longitudinal, cross-sectional view showing a step of cutting the outer peripheral surface of the structure to have the embedded electrode particles 2*a* partly exposed at the processed outer surface.
Figure 15:
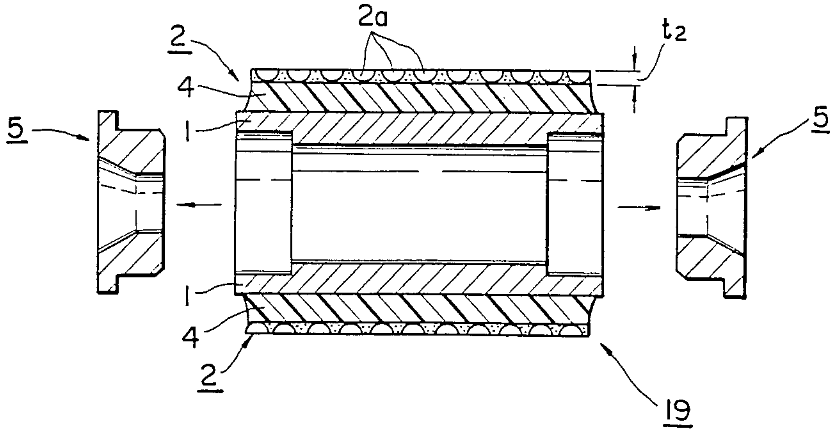
FIG. 15 is a longitudinal, cross-sectional view showing a step of removing the centering fittings and the resulting structure of the present developer carrier.

Then, after drying and sufficiently hardening the film of adhesive agent 2b, the adhesive agent 2b is again applied by the applicator onto the electrode particles 2a now secured by the hardened film of adhesive agent on the dielectric film 4. In the preferred embodiment, the adhesive agent applied for the second time at step of FIG. 13 is the same adhesive agent used to form an underlying film at the step of FIG. 9. However, different adhesive agents may also be used, if desired, as long as there is a compatibility between the two adhesive agents used, thereby allowing to securely hold the electrode particles 2a as embedded therein. With such a two-step structure in the application of adhesive agent, all of the electrode particles 2a can be properly located, i.e., in contact with the outer surface of the dielectric layer 4, and securely held as embedded in a resulting layer 2' of adhesive agent.

After application of the adhesive agent 2b for the second time to a desired thickness, the adhesive agent is hardened sufficiently, and, then, the whole structure W is again supported between the mandrels M, M, for example, of a lathe for removing the surface portion of the layer 2' containing the electrode particles 2a by means of the cutting tool B. As described previously, since the centering fittings 5, 5 have been fitted into the cylindrical support 1 on both ends, the entire structure W may be easily positioned with its center line in alignment with the rotating axis defined by the mandrels M, M. The layer 2' is cut by the cutting tool B repetitively until the layer 2' reaches a predetermined thickness $t_2$, at which condition, the electrode particles 2a embedded in the layer 2' become exposed at the freshly cut outer surface in the form of dots, so that the electrode layer 2 is formed. As understood, the remaining portions of the electrode particles 2a in the electrode layer 2 are approximately semi-spherical in shape. In this manner, the thickness $t_2$ of the electrode layer 2 may be made uniform across the entire surface and the electrode particles 2a may be securely held in the electrode layer 2.

That is, as will be described more in detail later, it is required that the area ratio between the total area of the exposed electrode particles 2a and the total peripheral surface of the electrode layer 2 be 45% or more in order to attain a desired edge effect and it is also required that less than a top half of each of the embedded electrode particles 2a be cut so as to prevent separation of electrode particle 2a from the electrode layer 2 from occurring. Under the circumstances, if use is made of electrode particles 2a having the diameter of 74 to 104 microns, the thickness $t_2$ of the electrode layer 2 must range between 52 and 62 microns. In accordance with the above-described process of the present invention, since all of the electrode particles 2a are deposited to be in contact with the outer surface of the dielectric layer 4, the embedded depth of each of the electrode particles 2a is equal to the thickness $t_2$ of the resulting electrode layer 2. Thus, as long as the electrode layer 2 is formed under control to have the thickness $t_2$ in the range between 52 and 62 microns, all of the electrode particles 2a in the electrode layer 2 can meet the above-mentioned requirements. This may be easily done even with cutting by a lathe using the centering fittings 5, 5 as mentioned above. It is to be noted, however, that the processing of the layer 2' to form the electrode layer 2 may be carried out by any other appropriate means, such as a cylindrical grinder, than a lathe. Upon formation of the electrode layer 2 as described above, the entire structure W is cleaned and the end or centering fittings 5, 5 are removed from the cylindrical support 1, so that there is provided a developer carrier 19 as a final product.

In the above-described embodiment, the application of adhesive agent has been carried out in two separate steps, but this may be carried out in more than two steps, if desired. It should further be noted that the dielectric layer 4 and the adhesive agent 2b may be of the identical or same kind of material, if desired. Moreover, if desired, the centering fittings 5, 5 may be temporarily removed from the cylindrical support 1 during the process.

Figure 16:
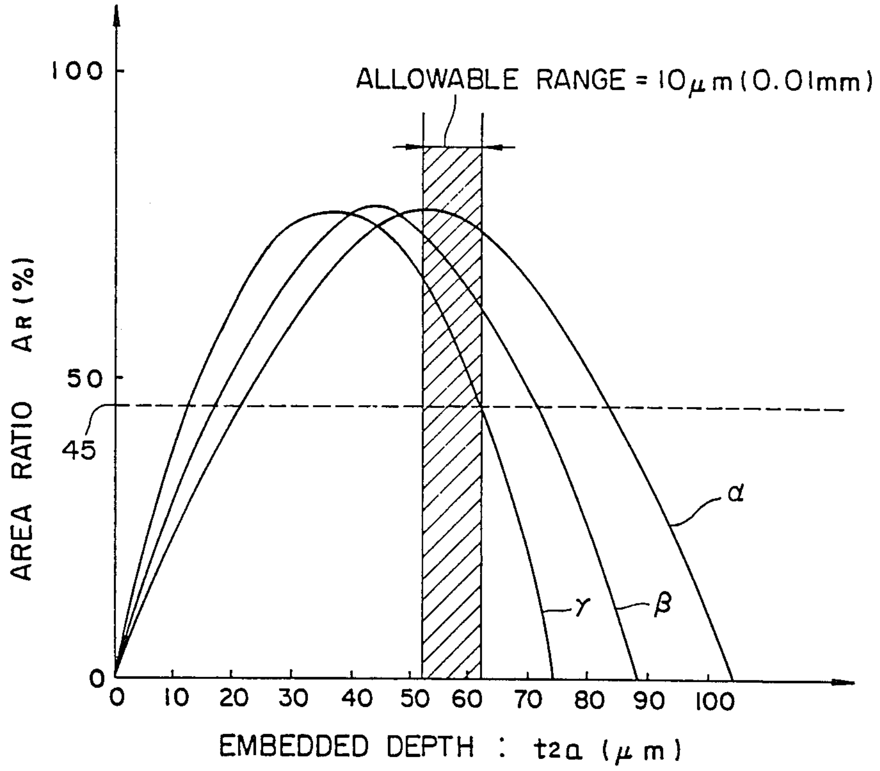
FIG. 16 is a graph showing the relation between the embedded depth of an electrode particle 2*a* in the layer 2*b* and the area ratio between the total exposed areas of the electrode particles 2*a* and the total area of outer peripheral surface of the electrode layer 2.

As mentioned previously, each of the electrode particles 2a, approximately sphere in shape, embedded in the resulting electrode layer 2 is required to have the embedded depth of 52 to 62 microns. This aspect will now be described in detail with reference to FIG. 16, in which the abscissa is taken for the embedded depth $t_{2a}$ in micron of electrode particle 2a and the ordinate is taken for the area ratio in % of the total area of exposed electrode particles 2a partially embedded in the electrode layer 2 to the total peripheral surface of the electrode layer 2. Three curves are shown in the graph of FIG. 16, in which curve alpha is for the electrode particle 2a having the maximum diameter of 104 microns, curve beta is for the electrode particle 2a having the average diameter, and curve gamma is for the electrode particle 2a having the smallest diameter of 74 microns. Now, since the area ratio $A_R$ must be set 45% or more in order to attain the desired developing characteristic by utilizing the edge effect, the maximum embedded depth is determined by an intersection between the curve gamma for the smallest diameter and the 45% area ratio line, which is 62 microns. On the other hand, in order to prevent separation of electrode particles 2a from the electrode layer 2 from occurring, the largest-sized particle of 104 microns in diameter must be embedded more than a half thereof. In other words, the embedded depth of each of the electrode particles 2a must be 52 microns or more so as to have all of the electrode particles 2a sufficiently anchored to the electrode layer 2. Accordingly, the embedded depth of each of the electrode particles 2a in the electrode layer 2 must be set to range between 52 and 62 microns under the above-described conditions.

Figure 17A:
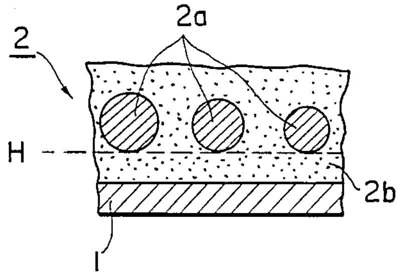
FIG. 17*a* is a schematic illustration showing the condition in which the electrode particles 2*a* are embedded as located properly in the electrode layer 2.
Figure 17B:
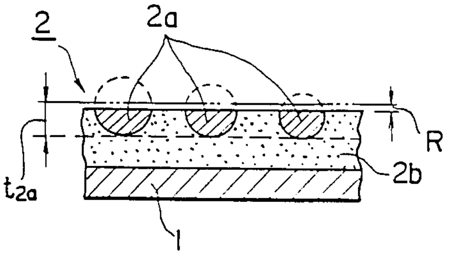
FIG. 17*b* is a schematic illustration showing the structure resulting from cutting the outer peripheral surface of the electrode layer shown in FIG. 17*a* to have the electrode particles 2*a* partly exposed at the cut surface.
Figure 18A:
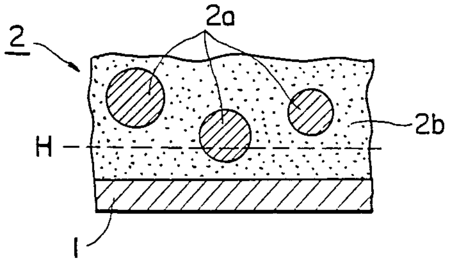
FIG. 18*a* is a schematic illustration showing the condition in which the electrode particles 2*a* are embedded as located irregularly in the electrode layer 2.
Figure 18B:
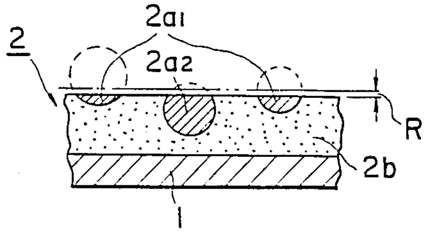
FIG. 18*b* is a schematic illustration showing the structure resulting from cutting the outer peripheral surface of the electrode layer shown in FIG. 18*a;*

In order to form the electrode layer 2, which meets the above-mentioned requirements, it is necessary to have the electrode particles 2a located at the same height H from the outer peripheral surface of the cylindrical support 1, as shown in FIG. 17*a*. If the electrode particles 2*a* may be so located within the adhesive material 2, it is only necessary to cut the outer surface until the embedded depth $t_{2a}$ reaches a predetermined range while maintaining a processing tolerance R within such a range. Thus, the desired electrode layer 2 may be easily formed once the electrode particles 2*a* have been properly located. However, such a proper positioning of electrode particles 2*a* cannot be carried out without difficulty. In reality, the electrode particles 2*a* come to be located at different heights from the outer surface of the cylindrical support 1 when deposited into a layer of adhesive material, as shown in FIG. 18*a*. If the outer surface is cut under the condition shown in FIG. 18*a* to form the electrode layer 2 as shown in FIG. 18*b* while maintaining the processing tolerance R to be less than 10 microns, there is produced a particle $2a_2$ which is not exposed sufficiently at the outer surface and a particle $2a_1$ which has been overcut and thus may be separated easily from the electrode layer 2. From this consideration, it may be understood that the above-described process according to the present invention allows to manufacture a developer carrier capable of meeting the before-mentioned requirements easily as well as securely.

Figure 19:
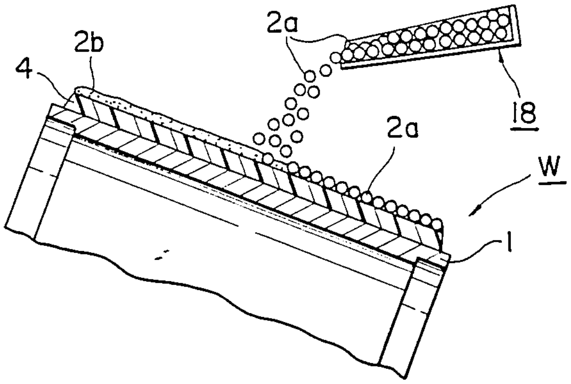
FIG. 19 is a schematic illustration showing a modified step for applying the electrode particles 2*a* onto the layer of adhesive agent 2*b;*
Figure 20A:
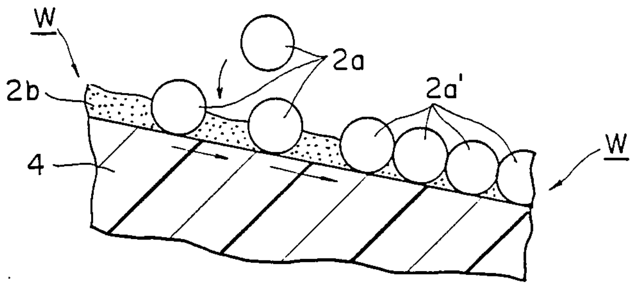
FIGS. 20*a* and 20 *b* are schematic illustrations showing how the electrode particles 2*a* are arranged when they are applied with the cylindrical substrate is maintained inclined and horizontal, respectively.
Figure 20B:
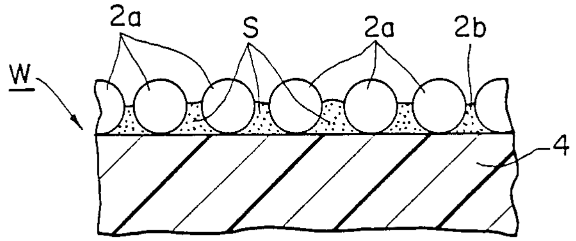

FIG. 19 illustrates a modified step for application of electrode particles 2*a* onto the film of adhesive agent 2*b* on the dielectric layer 4. In this modified step, the cylindrical support 1 is held inclined instead of being held horizontally as shown in FIG. 11. This modified step is advantageous in causing the deposited electrode particles 2*a* to be more densely populated. That is, if the particles 2*a* are applied with the cylindrical support 1 held horizontally as shown in FIG. 11, a clearance S formed between the two adjacent particles 2*a* may be appreciable. On the other hand, if the electrode particles 2*a* are applied with the cylindrical support 1 held inclined, as shown in FIG. 19, the electrode particles 2*a* may be deposited more densely without forming a clearance between the adjacent particles 2*a*′, as shown in FIG. 20*a*. In this case, the adjacent particles 2*a*′ are in contact with each other, but this does not present any problem because each of the particles 2*a* is coated with an electrically insulating material thereby permitting the particles 2*a*′ to be electrically isolated from one another.

Figure 21:
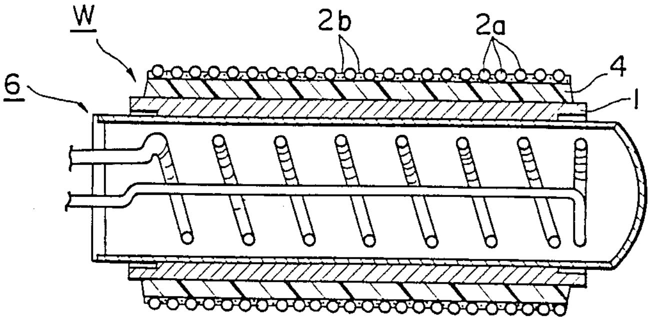
FIG. 21 is a longitudinal, cross-sectional view showing a step of hardening the first adhesive agent by application of heat thereto after application of the electrode particles 2*a;*

FIG. 21 illustrates a modified step of causing the adhesive agent 2*b* to be hardened and this corresponds to the step shown in FIG. 12 in the above-described process. Although hardening of the adhesive agent 2*b* may be expedited by application of heat using a heater, such as a far-infrared heater, from outside while keeping the whole structure W in rotation, the entire structure W may be again fitted onto the sheathed heater 6 to apply heat to harden the adhesive agent 2*b*, as shown in FIG. 21. It is to be noted that if use is made of an adhesive agent having the property of quick hardening, the application of heat at this step may be omitted, and it may be that the adhesive agent is left alone to harden by itself or a stream of air flow may be directed thereto.

Figure 22:
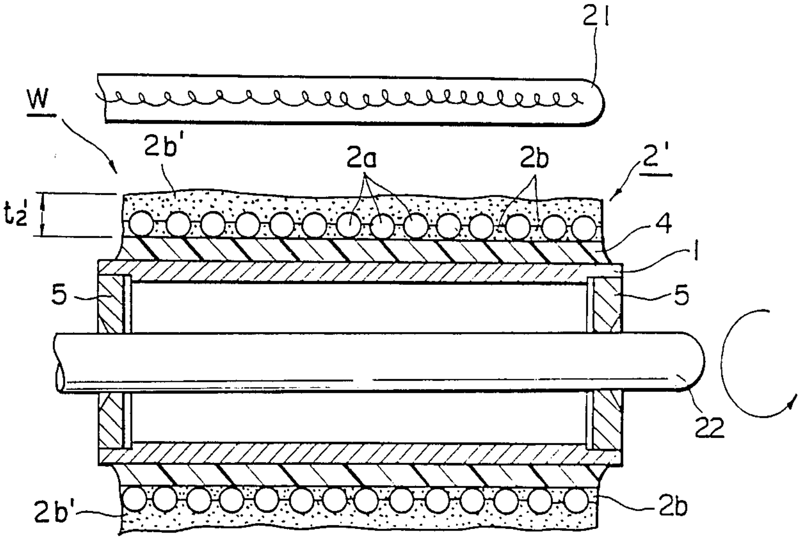

FIG. 22 shows a step of applying heat to the overlying layer of adhesive agent 2*b*′ for causing the adhesive agent 2*b*′ to be securely hardened, which may be additionally carried out after the step of FIG. 13 in the above-described process of the present invention. That is, after forming the overlying layer of adhesive agent 2*b*′ to have the electrode particles 2*a* embedded, the entire structure W is supported on a rotating shaft 22. And, while keeping the entire structure W in rotation, heat is applied to the overlying layer 2*b*′ by means of a far-infrared heater 21, so that the adhesive agent 2*b*′ forming the overlying layer may be hardened securely as well as completely. It is to be noted, however, that this step of heat application may be omitted depending on the property of the adhesive agent used and the conditions of the overall manufacturing process.

Figure 23A:
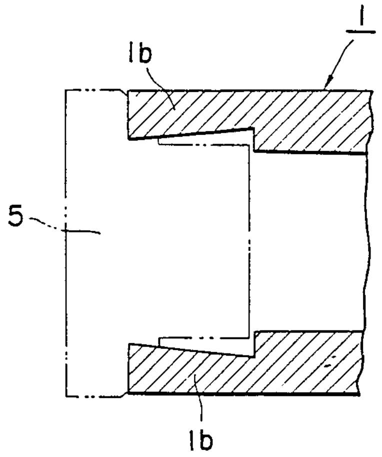
FIGS. 23a and 23b are schematic illustrations showing modified structures of the cylindrical substrate 1 which may be advantageously used in the present invention.
Figure 23B:
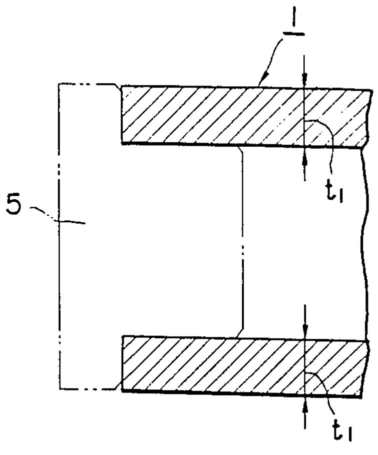

FIGS. 23*a* and 23*b* illustrate two alternative embodiments of the cylindrical support 1. If the cylindrical support 1 is to be made from a non-magnetic material, such as stainless steel, it must be made as thin as practicably possible so as to allow to obtain a maximum possible magnetic force at the outer surface of a developer carrier. In the embodiment shown in FIG. 23*a*, an inwardly expanding tapered section 1*b* is provided at each end of the cylindrical support 1. In this case, the centering fitting 5 is preferably formed to have a stepped insert section having a smaller diameter top portion and a larger diameter base portion in which the latter comes to be press-fitted into the tapered section 1*b* when set in position. With such a structure, attachment and removal of the centering fitting 5 may be carried out easily as well as smoothly. It is also to be noted that tolerance in manufacture of the cylindrical support 1 and centering fitting 5 may be relaxed significantly. FIG. 23*b* shows the embodiment, in which the cylindrical support 1 is not provided with a tapered section at each end. In this case, the cylindrical support 1 requires a higher manufacturing tolerance in obtaining a desired thickness $t_1$.

Figure 24:
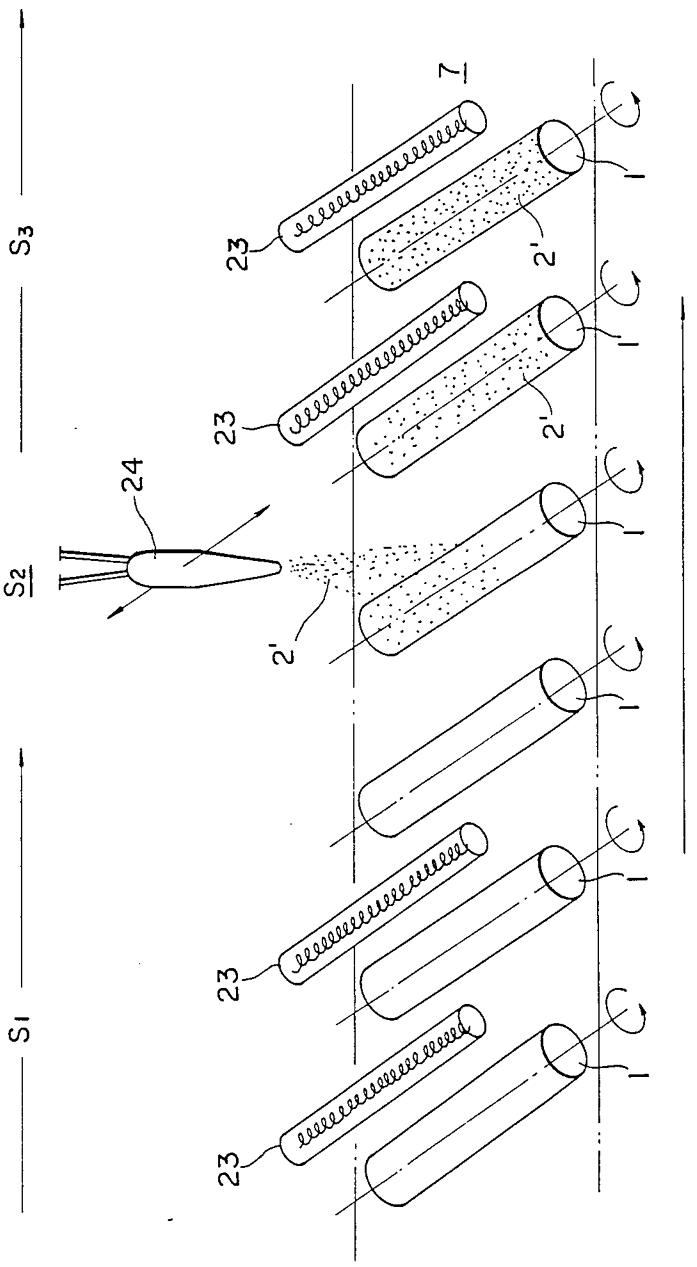
FIG. 24 is a schematic illustration showing a modified step for applying dielectric powder to a plurality of cylindrical substrates 1 one after another in a continuous fashion.

FIG. 24 illustrates another method for applying dielectric powder to the cylindrical support 1 to form an underlying dielectric layer 2′ thereon, and this corresponds to the step of FIG. 5 in the above-described process. It is to be noted that the dielectric powder 2′ here corresponds to the dielectric powder 4′ in FIG. 5. As shown in FIG. 24, there is defined a conveyor system 7 for transporting a plurality of cylindrical supports 1 in rotation along a predetermined path in the direction indicated by the arrow. Such a conveyor system 7 may be constructed in any manner as is well known for those skilled in the art. For example, the conveyor system 7 may be comprised of a pair of endless chains disposed in parallel as spaced apart from each other and a plurality of holder units mounted on the chains at a spaced interval for rotatably holding the cylindrical supports 1 as shown in FIG. 24. Along the transportation path of conveyor system 7, there are defined three regions including a preheating region $S_1$, a dielectric powder application region $S_2$ and a hardening region $S_3$. In the preheating and hardening regions $S_1$ and $S_3$, a plurality of heaters 23, far-infrared heaters in the illustrated embodiment, are disposed at a spaced interval above the transportation path. In the application region $S_2$ is disposed an applicator 24 for applying the dielectric powder 2′ onto the cylindrical support 1 by letting the dielectric powder 2′ falling under gravity at a regulated amount. In the preferred embodiment, however, the electrostatic spraying method is applied, in which case an electrostatic field is created between the applicator and each of the cylindrical supports 1 so that the dielectric powder 2′ charged to a predetermined polarity is electrostatically attracted to each of the cylindrical supports 1. It is so structured that the applicator 24 moves in a direction perpendicular to the transportation direction by the conveyor system 7 and the applicator 24 moves much faster than the transportation speed of conveyor system 7. With such a structure, formation of underlying dielectric layer 2', which corresponds to 4' in FIGS. 5–7, can be carried out in a continuous fashion. It should also be noted that use may be made of an electrical furnace instead of far-infrared heater 23.

Figure 25:
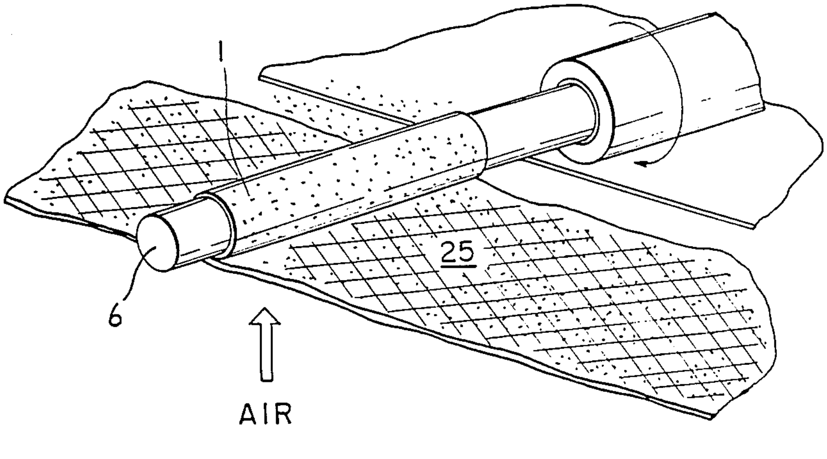
FIG. 25 is a schematic illustration showing a further modified step for applying dielectric powder to the cylindrical substrate 1.

FIG. 25 illustrates a further modification in forming an underlying dielectric layer on the cylindrical support 1. In this example, the cylindrical support 1 remains fitted onto the sheathed heater 6 and is kept in rotation. The cylindrical support 1 is maintained in a flow of air having a suspension of dielectric powder 25, which corresponds to powder 2' in FIG. 24 and powder 4' in FIGS. 5–7. With this structure, the dielectric powder 25 suspended in the flow of air comes to stick to the cylindrical support 1 by melting as soon as it hits the heated surface of cylindrical support 1. The preferred material for this dielectric powder includes epoxy resin, polyester resin, polyimide resin and ABS resin.

Figure 26:
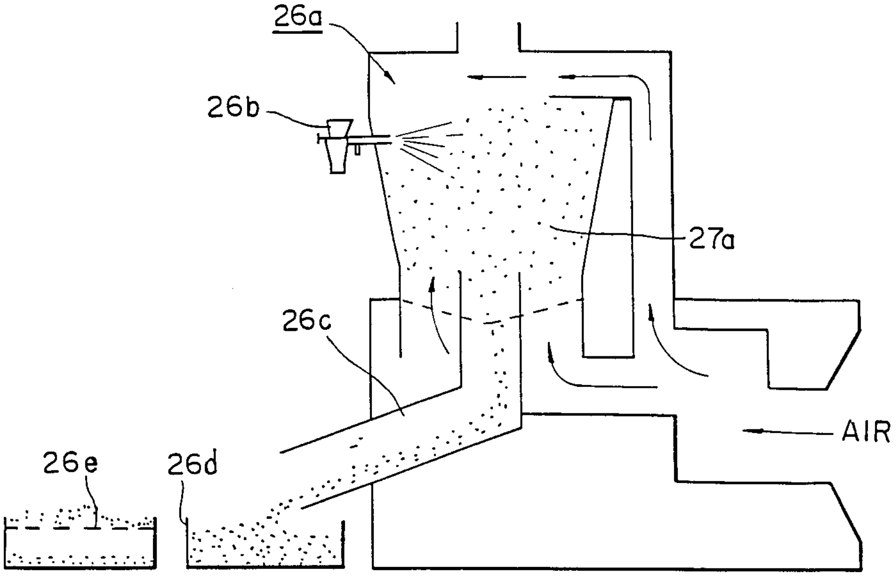
FIG. 26 is a schematic illustration showing a system for coating the electrode particles of conductive material with an electrically insulating material.

FIG. 26 illustrates a system for preparing coated electrode particles 2a which are comprised of electrically conductive particles coated with an electrically insulating material and which are to be applied onto the layer of adhesive agent 2b at the step shown in FIG. 11. As shown in FIG. 26, the system includes a coating chamber 26a containing therein a quantity of copper particles 27a having the diameter ranging from 74 to 104 microns, and a flow of air is lead into this chamber 26a both at its top and bottom, thereby causing the copper particles 27a to be floating in the air. A spray gun 26b is provided as mounted on a wall of the coating chamber 26a for discharging an electrically insulating material, such as styrenebutylacrylate, as atomized into the chamber 26a. Since the copper particles 27a are floating around in the coating chamber 26a, they become coated with the electrically insulating material discharged into the chamber 26a. It can be designed such that the residence time of the particles 27a in the chamber 26a is long enough to form a coating of approximately 2 microns on each of the particles 27a before being lead out of the chamber 27a.

An outlet duct 26c is provided as extending from the bottom of the coating chamber 26a to a tray 26d, so that the copper particles 27a now coated with the insulating material to a predetermined thickness are transported to the tray 26d. The coated copper particles now collected in the tray 26d are then transferred to an oscillating sieve 26e of 150–200 mesh, where the coated copper particles of selected size range may be obtained. The coated copper particles thus obtained may now be used, for example, at the step shown in FIG. 11. It is to be noted, however, that use may be made of other coating materials, such as methylmetacrylate (MMA).

Figure 27:
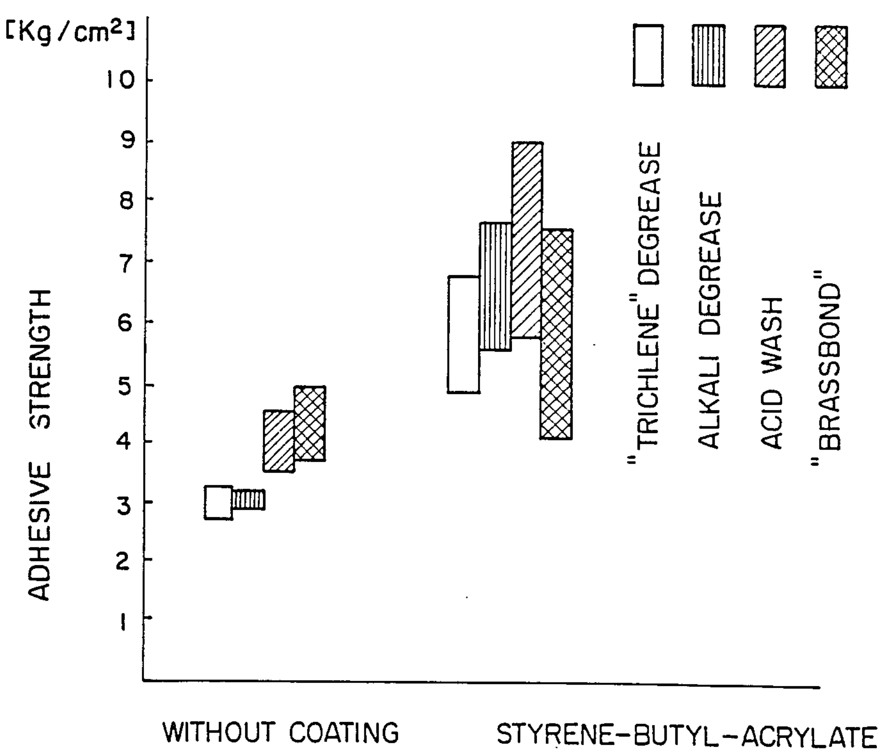
FIG. 27 is a graph showing the adhesive strength of coating material when processed in various methods.
Figure 28:
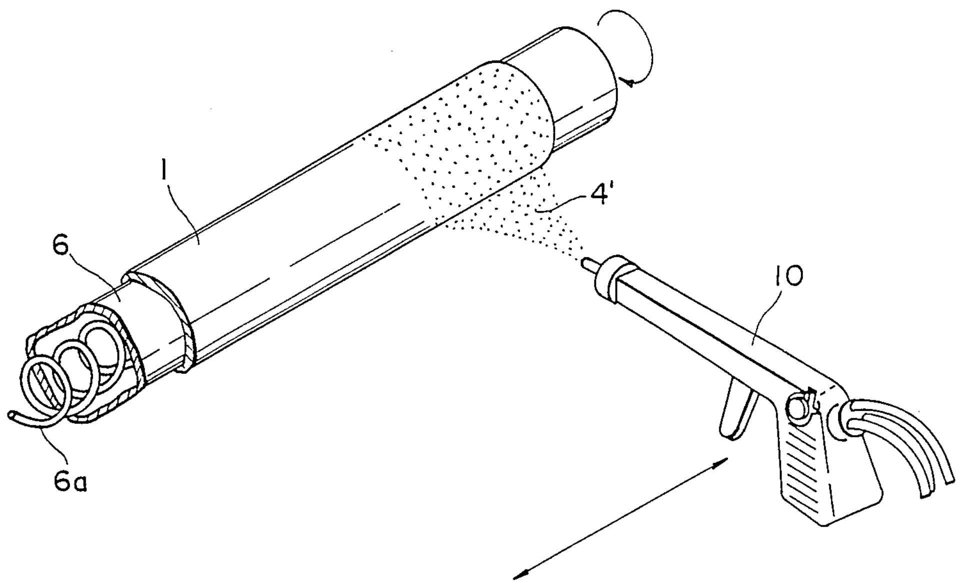
FIGS. 28 through 37 are schematic illustrations showing the structure at various steps of a process for manufacturing a developer carrier in accordance with another embodiment the present invention.

It is to be further noted that the adhesive strength between the electrode particles 2a and the adhesive agent 2b can be increased due to the presence of styrenebutylacrylate therebetween as coated on the particles 2a as graphically shown in FIG. 27. That is, as compared with the case of no coating, the provision of styrenebutylacrylate as coated on the particles 2a allows to increase their adhesivity to the adhesive agent 2b. According to the experimental results shown in FIG. 27, the greatest adhesive strength is obtained when the particles are pre-treated with acid wash among the four pretreatment methods tested.

Figure 29:
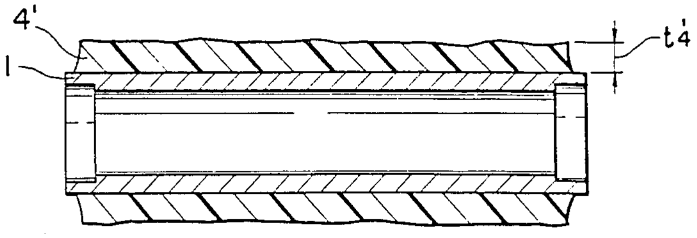

Referring now to FIGS. 28 through 37, it will now be described as to another process for manufacturing a developer carrier having floating electrodes in accordance with the present invention. It is to be noted that in the following description like numerals are used to indicate like elements as described previously. As. shown in FIG. 28, the cylindrical support 1 of stainless steel or any other electrically conductive material is prepared and after subjecting the outer peripheral surface of cylindrical support 1 to degreasing treatment, the cylindrical support 1 is slidably fitted onto the sheathed heater 6 having the spiral heater 6a therein. While heating the cylindrical support 1 to a predetermined temperature, preferably 180° C. in the illustrated example, the dielectric powder 4', preferably thermosetting resin such as epoxy resin, is applied to the cylindrical support 1 by means of the electrostatic spray gun 10, which is moved back and forth in parallel with the cylindrical support 1. The application of dielectric powder 4' is continued until the dielectric powder 4' deposited onto the cylindrical support 1 forms a layer of approximately 500 microns in thickness thereon. Even after termination of application of the powder 4', heating is continued for an extended period of time thereby allowing the layer of dielectric powder 4' to harden completely as shown in FIG. 29.

Figure 30:
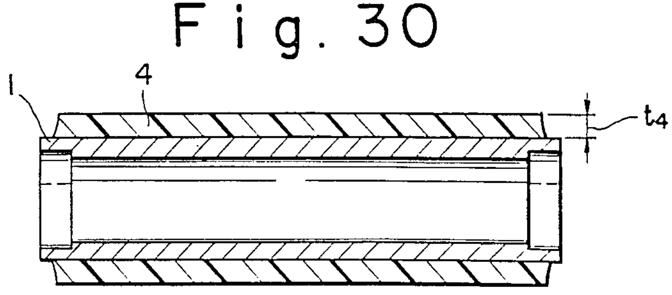
Figure 31:
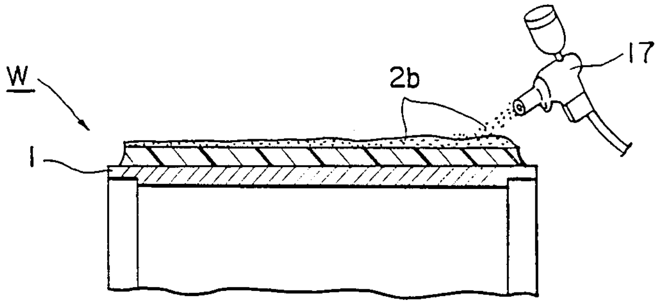
Figure 32:
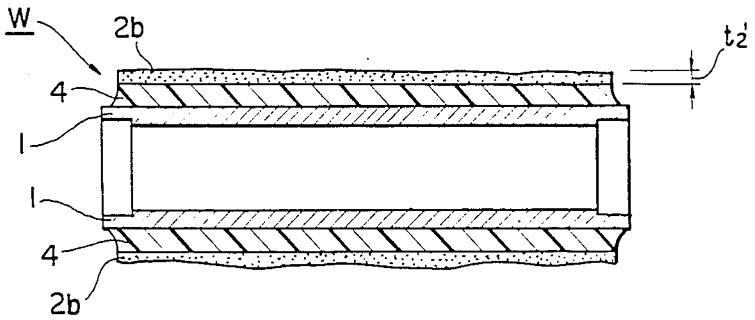

Then, the outer surface of the layer of dielectric powder 4' is removed, for example, by a lathe or a cylindrical grinder, thereby forming the underlying dielectric layer 4 having the thickness $t_4$ preferably in the order of 400 microns, as shown in FIG. 30. Then, after cleaning the processed outer surface of the dielectric layer 4, the adhesive agent 2b of a material which is dielectric and which hardens at a relatively low temperature, such as acrylicurethane, is applied uniformly to the outer peripheral surface of the dielectric layer 4 again using the compressed air spray type applicator 17. Thus, there is formed a film of adhesive agent 2b on the underlying dielectric layer 4 to a thickness $t_2'$, which preferably ranges from 3 to 15 microns in the case where the electrode particles 2a to be applied in the next following step have the diameter ranging between 74 and 104 microns.

Figure 33:
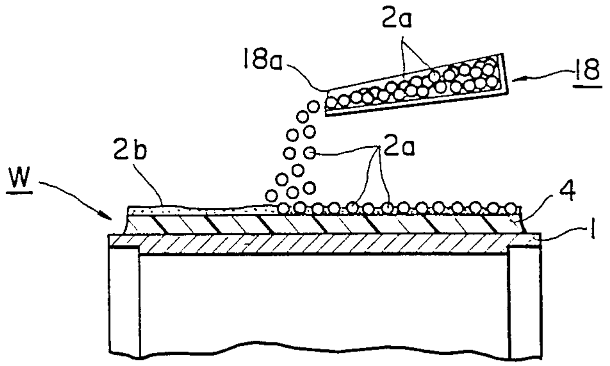
Figure 34:
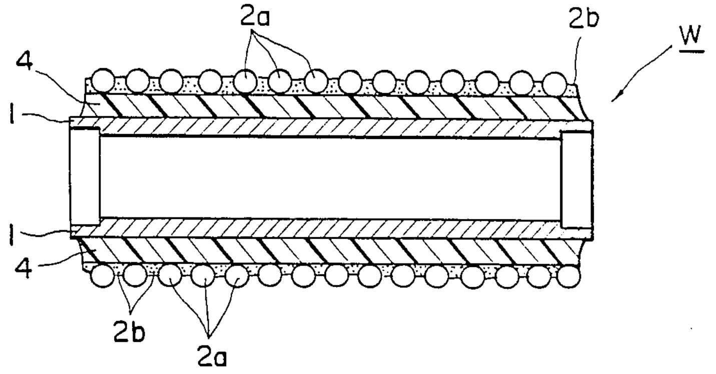
Figure 35:
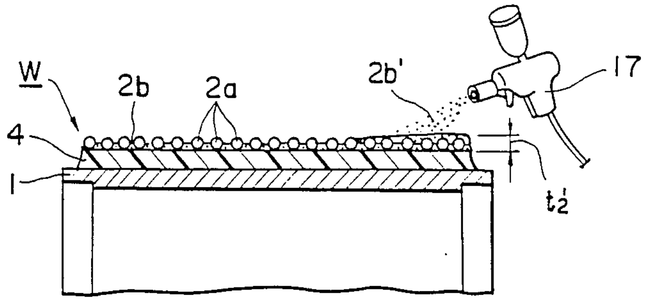

As soon as the adhesive agent 2b has been applied, before it hardens, a plurality of electrode particles 2a are deposited to the adhesive agent 2b on the dielectric layer 4, as shown in FIG. 33. The resulting structure W is shown in FIG. 34, in which all of the electrode particles 2a are partly embedded in the film of adhesive agent 2b and properly positioned in contact with the outer peripheral surface of the dielectric layer 4. As described previously, the electrode particles 2a are coated with an insulating material so that they may be maintained electrically isolated from one another even if they are applied at random. Furthermore, since the application of the electrode particles 2a takes place before the adhesive agent 2b hardens and the film of adhesive agent 2b is relatively thin as compared with the average size of electrode particles 2a, the electrode particles 2a are prevented from floating on the film of adhesive agent 2b and it is insured that all of the electrode particles 2a come into contact with the outer peripheral surface of the underlying dielectric layer 4. Similarly with the previously described process, the electrode particles 2a may be comprised of any desired electrically conductive material, but the preferred materials include copper, bronze, phosphor bronze and stainless steel.

Upon application of the electrode particles 2a as described above, the adhesive agent 2b is completely hardened. For this purpose, any of the above-described techniques, such as application of heat, may be employed to expedite the drying or hardening of the adhesive agent 2*b*. Then, as shown in FIG. 35, again using the applicator 17, another adhesive agent 2*b*' is applied overlying the hardened film of adhesive agent 2*b* with the electrode particles 2*a*. In the preferred mode, the second adhesive agent 2*b*' is identical to the first adhesive agent 2*b*, but they may differ as long as they can stick together strongly. As described previously, such a two-step application of adhesive agent is of particular importance in positioning the electrode particles 2*a* properly embedded in the resulting layer of adhesive agent.

Then, the entire structure W is again slidably fitted onto the rotating sheathed heater 6 and the layer 2' of adhesive agent is hardened completely with application of heat. With such a structure, the layer 2' of adhesive agent may be hardened completely to a uniform thickness $t_2'$ preferably in the order of 150 microns.

Figure 37:
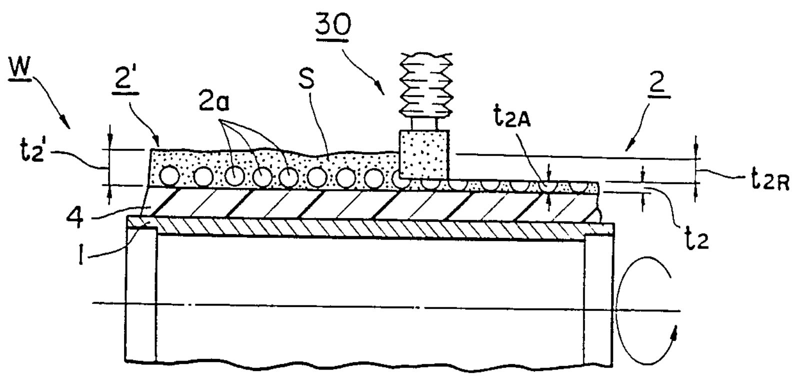

Thereafter, as shown in FIG. 37, the outer surface of the adhesive agent layer 2' is processed to remove the surface portion and the embedded electrode particles 2*a* partly thereby having the embedded electrode particles 2*a* exposed at the processed outer surface to define the electrode layer 2 having the thickness $t_2$ which is equal to the embedded depth $t_{2A}$ of each of the electrode particles 2*a* because all of the particles 2*a* are arranged to be in contact with the outer peripheral surface of the underlying dielectric layer 4. As discussed in detail before, as long as the thickness $t_2$ of the resulting electrode layer 2 is controlled to range between 52 to 62 microns, the exposed area ratio $A_R$ may be automatically set at 45% or more and all of the electrode particles 2*a* may be provided as embedded in the electrode layer 2 more than a half thereby insuring a sufficient anchoring effect to prevent the occurrence of easy separation of electrode particle from the electrode layer 2.

As shown in FIG. 37, the step of processing the outer peripheral surface of layer 2' to define the electrode layer 2 according to the present process is implemented using the surface processing method with the outer peripheral surface S used as a reference. One of the surface processing techniques suitably applicable to the present invention is the superfinishing method. This aspect of the present process will now be described in detail with particular reference to FIGS. 38 through 41 hereinbelow.

Figure 36:
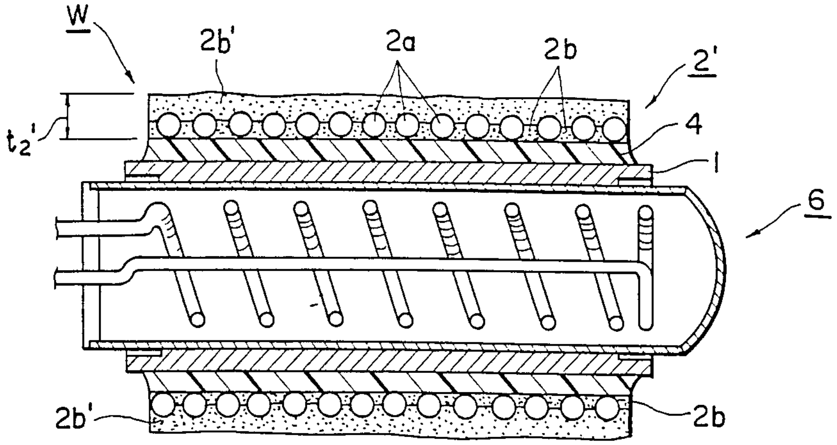
Figure 38:
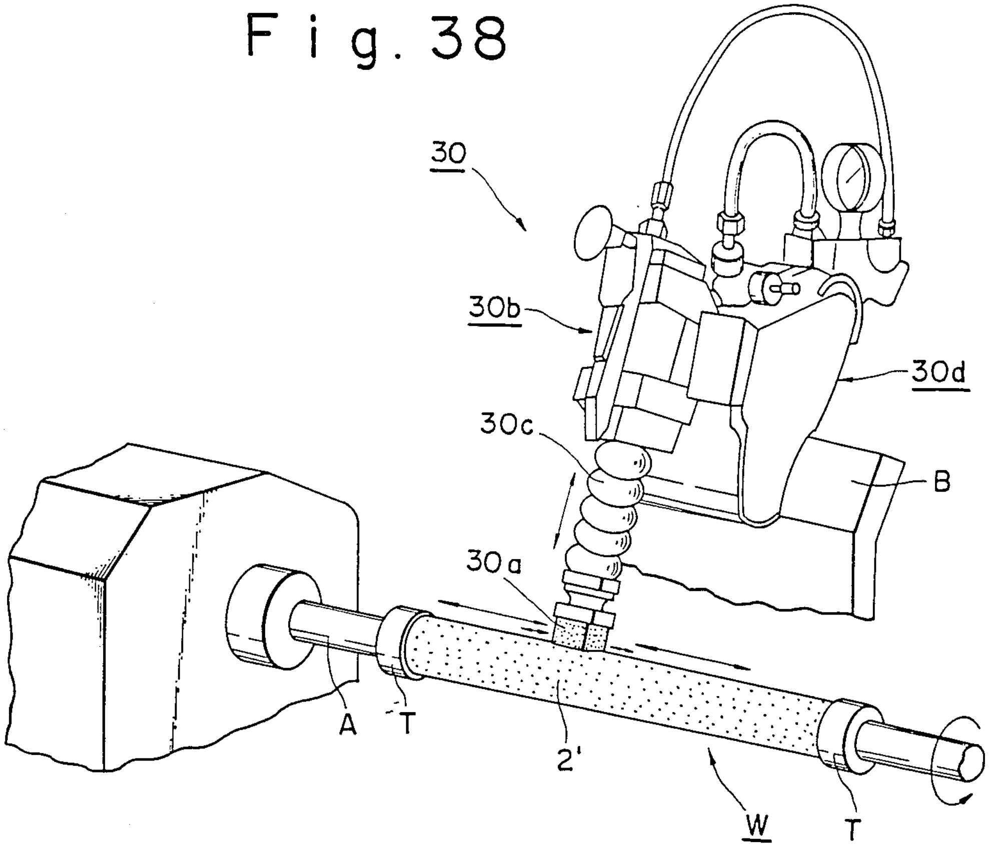
FIG. 38 is a schematic illustration showing a step of processing the outer peripheral surface of the structure in accordance with the superfinishing method.

FIG. 38 illustrates a superfinishing unit 30 mounted on a carriage B of a lathe. As shown, the workpiece W having the structure shown in FIG. 36 is fixedly supported between a pair of spindles A such that the workpiece W may be rotated around its longitudinal center axis. With the workpiece W in rotation, an abrasive stone 30*a* is moved along the workpiece W as pressed thereagainst while maintaining oscillation in the longitudinal direction of the workpiece W thereby removing the surface thereof. As shown, the abrasive stone 30*a* is fixedly mounted at the bottom end of a stone guide 30*b* provided with an air cylinder 30*c* which causes the abrasive stone 30*a* to move up and down. Besides, the air cylinder 30*c* also serves as a cushion to absorb fluctuations which could result from irregularities in the surface being processed during operation. The stone guide 30*b* is mounted on a superfinishing head 30*d*, which is provided with an exciting means (not shown) for producing an oscillation in the abrasive stone 30*a* in the longitudinal direction of the workpiece W, so that the abrasive stone 30*a* is set in oscillation, for example, at the frequency of 1,900–3,200 cpm and amplitude of 1–6 mm through the stone guide 30*b*. As described above, the head 30*d* is mounted on the carriage B which executes a reciprocating movement along the center line defined by the spindles A. Thus, the superfinishing head 30*d*, stone guide 30*b* and abrasive stone 30*a* move in unison together with the carriage B in a reciprocating manner along the workpiece W at constant speed. The abrasive stone 30*a* is typically comprised of powder of black silicon carbide, green silicon carbide, brown aluminum oxide or white aluminum oxide and a binder of polyvinyl alcohol and a thermosetting resin.

Figure 39A:
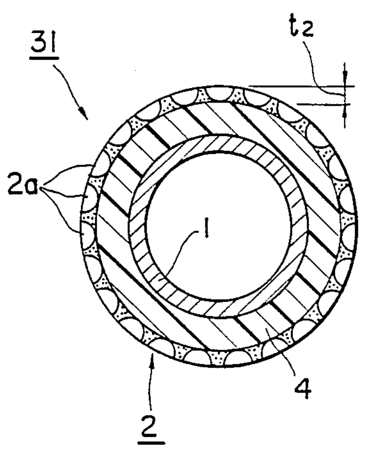
FIGS. 39a and 39b are transverse and longitudinal cross-sectional views of a resultant developer carrier manufactured according to the sequence of steps shown in FIGS. 28 through 37.
Figure 39B:
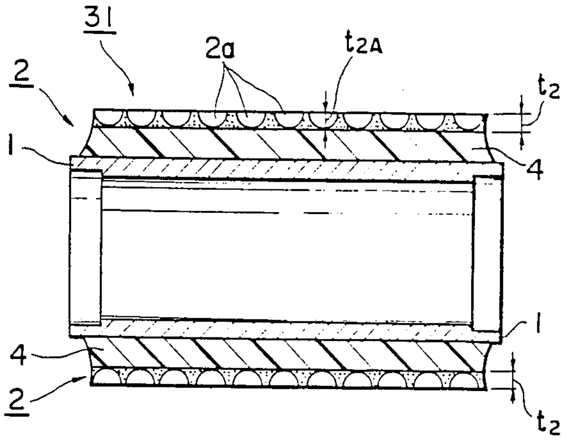

When processing the outer peripheral surface of the to-be-formed electrode layer 2' with such a superfinishing unit 30, the workpiece W is first set in position with its both ends supported by the spindles A. In this case, an appropriate end fitting T may be fitted at each end of the workpiece W, thereby permitting to carry out setting of the workpiece W with ease and to protect the end portions of the workpiece W from being damaged. Then, the air cylinder 30*b* is actuated to have the abrasive stone 30*a* pressed against the peripheral surface of the workpiece W at a relatively light pressure, typically *1* kg/cm$^2$. Then, the spindles A are set in rotation, followed by initiation of oscillation of the abrasive stone 30*a* and feed motion of the carriage B, thereby carrying out the superfinishing operation. If the outer peripheral surface of the to-be-formed electrode layer 2' is processed in this manner, there may be obtained the electrode layer 2 having the thickness $t_2$ falling onto a desired range of 52 to 62 microns irrespective of the accuracy in locating the center axis of the workpiece W subject to the supporting condition by the spindles A, as shown in FIGS. 39*a* and 39*b*.

Figure 41:
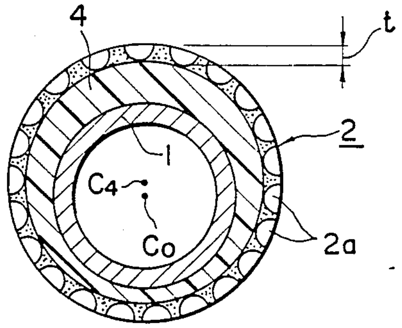
FIG. 41 a transverse, cross-sectional view of another resultant developer carrier manufactured according to the sequence of steps shown in FIGS. 28 through 37.
Figures 40A, 40B:
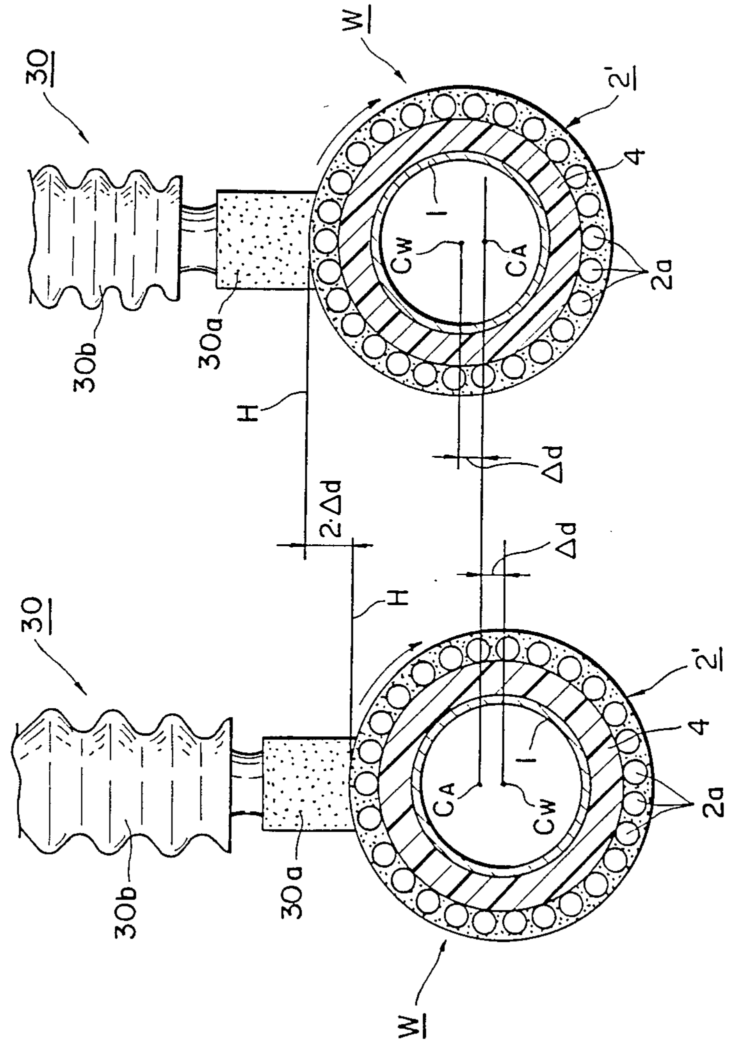
FIGS. 40a and 40b are schematic illustrations showing the operation of processing the electrode layer according to the method.

Described more in detail in this respect with particular reference to FIGS. 40*a* and 40*b*, in the case where the workpiece W is supported with its center axis $C_W$ offcentered from the supporting center axis $C_A$ defined by the spindles A for supporting the workpiece W by an amount delta d, a contact line H between the abrasive stone 30*a* and the workpiece W moves up and down over a distance determined by twice of delta d as the workpiece W rotates around the supporting axis $C_A$. However, such a vertical movement may be absorbed by the air cylinder 30*b* so that the contact pressure between the abrasive stone 30*a* and the workpiece W may be maintained substantially unchanged between the condition shown in FIG. 40*a*, in which the contact point H is located at the lowest point, and the condition shown in FIG. 40*b*, in which the contact point H is located at the highest point. Accordingly, using the initial outer peripheral surface S shown in FIG. 37 as a reference, the amount of surface portion removed due to the superfinishing operation is defined by a thickness $t_{2R}$ as measured from the original outer surface S inwardly and this thickness may be maintained uniform across the entire surface. In the present embodiment, since the to-be-formed electrode layer 2' has been formed to be substantially uniform in thickness of 150 microns, the superfinishing operation should be carried out to remove the surface portion with the thickness $t_{2R}$ ranged between 88 and 98 microns. When processed with such a superfinishing technique using the abrasive stone 30*a* having the typical grain size of No. 5,000, there may be obtained a finished surface having the surface roughness in the order of 0.05 microns RZ at minimum, so that if the range of fluctuation in thickness $t_2'$ of to-be-formed electrode layer 2' is controlled to be 10 microns or less, the electrode layer 2 whose thickness $t_2$ ranges between 52 and 62 microns suitably results with ease. As shown in FIG. 41, even if the underlying dielectric layer 4 is formed to be slightly off-centered with respect to the center axis $C_0$ of the cylindrical support 1 because of a mismatch between the supporting axis $C_4$ and the center axis $C_0$ at the time of processing the dielectric layer 4, the electrode layer 2 whose thickness $t_2$ is uniform across the entire surface may be obtained at upmost precision stably according to this superfinishing operation.

Figure 42:
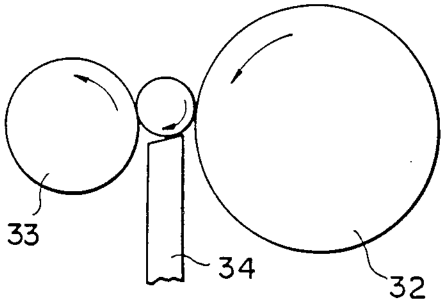
FIG. 42 is a schematic illustration showing a modified step of processing the outer peripheral surface of the electrode layer using a cylindrical grinder.

FIG. 42 shows a centerless cylindrical grinding scheme which may be applied as an alternative step to the above-described superfinishing operation in order to define the electrode layer 2 using the initial outer peripheral surface as a reference. In this alternative scheme, the workpiece W is placed between a grinding wheel 32 and a regulating wheel 33 as supported on a work rest blade 34 and thus the workpiece W is processed such that its surface is removed using its original outer peripheral surface as a reference. This scheme is of particular advantage when processing the outer peripheral surface of a workpiece which is relatively smaller in diameter.

Figure 43A:
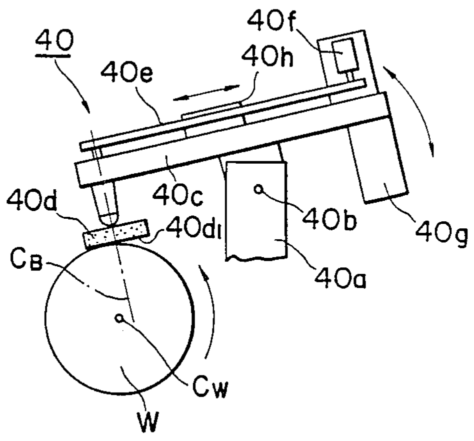
FIGS. 43a through 43c are schematic illustrations showing a further modified step of processing the outer peripheral surface of the electrode layer.
Figure 43B:
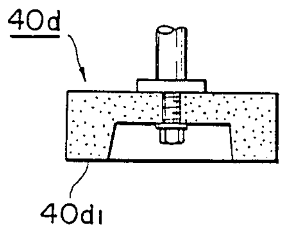
Figure 43C:
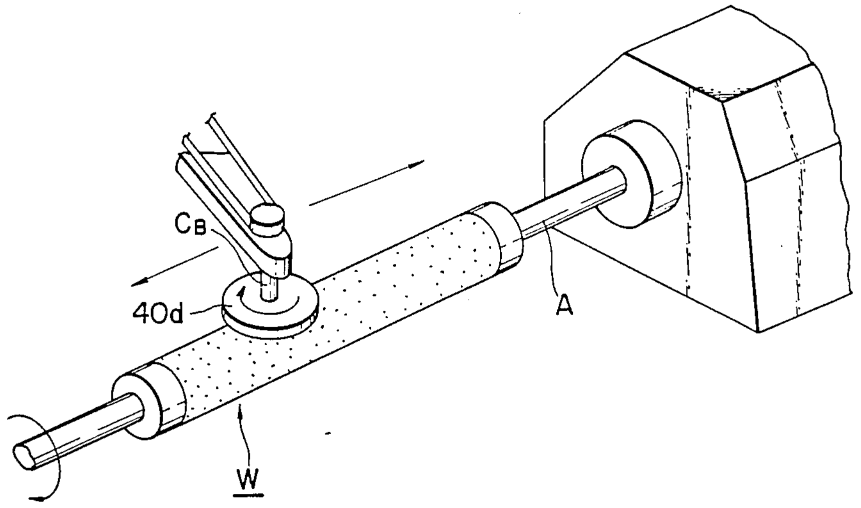

FIGS. 43 and 44 show a further alternative method to carry out the step of surface removing operation using the original outer peripheral surface S as a reference as shown in FIG. 37. As shown in FIG. 43*a,* the present surface finishing or processing unit 40 includes a center column 40*a* on which a support bar 40*c* having a grinding stone 40*d* rotatably provided at one end thereof is pivotally supported at a pivot 40*b*. As shown in FIG. 43*b,* the grinding stone 40*d* is generally cup-shaped and it is mounted as inverted at one end of the support bar 40*c* to be rotatable around a rotating axis $C_W$ which is generally perpendicular to the rotating axis $C_W$ of the workpiece W. Under the condition, a ridge end surface 40*d*$_1$ of the cup-shaped grinding stone 40*d* is brought into grinding contact with the outer peripheral surface of the workpiece W for processing and removing the outer peripheral surface of the workpiece W. The grinding stone 40*d* is operatively coupled to a motor 40*f* through an endless driving belt 40*e*. Besides, the support bar 40*c* is provided with a weight 40*g* at the end opposite to the end where the grinding stone 40*d* is provided, and a balance regulating weight 40*h* is also provided as adjustable in position along the lengthwise direction of the support bar 40*c*. By adjusting the position of the weight 40*h* on the support bar 40*c,* the contact pressure between the grinding stone 40*d* and the workpiece W may be suitably adjusted. Furthermore, it is so structured that the present surface finishing unit 40 moves in parallel with the workpiece W in a reciprocating manner, so that the grinding stone 40*d* moves along the workpiece W in contact therewith. In practice, as shown in FIG. 43*c,* the surface finishing unit 40 is mounted on the carriage of a lathe and the workpiece W is supported on spindles A to be rotated around its longitudinal center axis. Under the condition, the grinding stone, while being driven to rotate around the axis $C_B$, is moved along the workpiece W in rotation as being pressed thereagainst so that the outer peripheral surface of the workpiece W is uniformly ground.

Figures 44A, 44B:
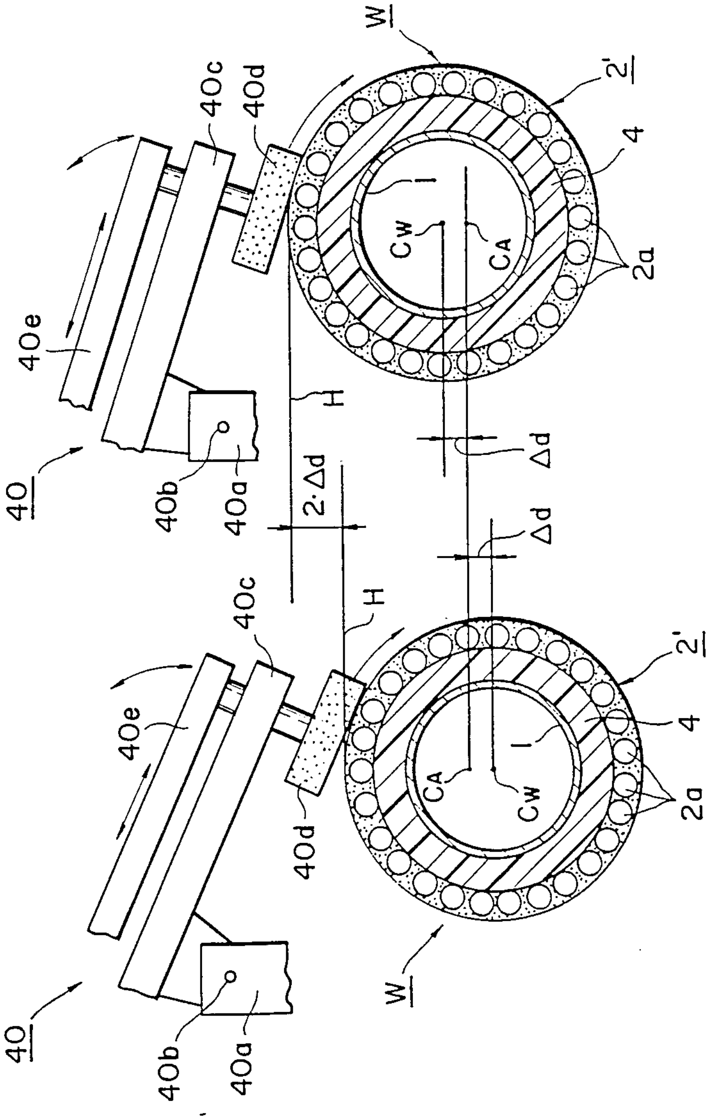
FIGS. 44a and 44b are schematic illustrations which are useful for explaining the operation of the step shown in FIGS. 43a through 43c.

If processed as described above, there is formed the electrode layer 2 of desired thickness $t_2$ ranging between 52 and 62 microns, as shown in FIGS. 39*a* and 39*b,* irrespective of the rotating axis of the workpiece W determined by the supporting condition by the spindles A. Described more in detail in this respect, as shown in FIGS. 44*a* and 44*b,* in the case where the supporting axis $C_A$ defined by the spindles A which support the workpiece W is offcentered from the center axis $C_W$ of the workpiece W (more exactly, the axis $C_W$ corresponds to the supporting axis of workpiece W when the outer surface of dielectric layer 4 is processed) by an amount of delta d, a contact line H between the grinding stone 40*d* and the workpiece W moves up and down over a distance of twice of delta d. However, since the support bar 40*c* is pivotally supported at the pivot 40*b* and counter-balanced by the weights 40*g* and 40*h,* the support bar 40*c* pivots according to this fluctuation, so that the contact pressure between the grinding stone 40*d* and the workpiece W may be maintained substantially at constant even if the contact line H moves between the lowest level shown in FIG. 44*a* and the highest level shown in FIG. 44*b*. As a result, as shown in FIG. 37, the surface portion of the to-be-formed electrode layer 2' is removed over a thickness $t_{2R}$ as measured from the original outer peripheral surface S uniformly across the entire surface.

In the illustrated embodiment, since the to-be-formed electrode layer 2' is formed to be of uniform thickness $t_2'$ of approximately 150 microns, it is only necessary to carry out surface removing operation such that the removed thickness $t_{2R}$ ranges between 88 and 98 microns. It is to be noted that this surface processing technique is also capable of attaining all of the advantages which have been described with reference to FIG. 41 in connection with the previous surface processing technique.

Figure 45:
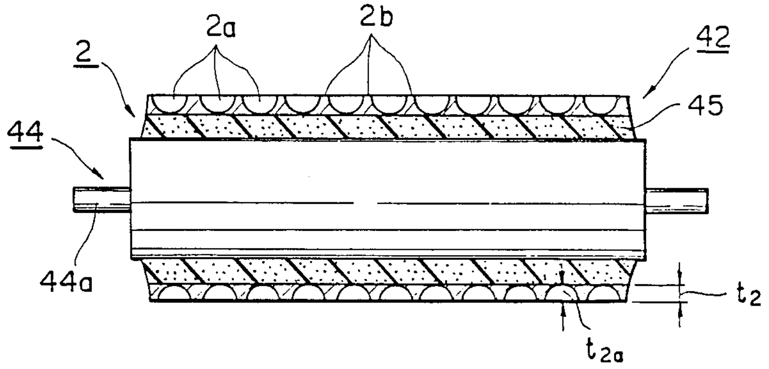
FIGS. 45 and 46 are cross-sectional views showing developer carriers constructed in accordance with other embodiments of the present invention.

FIG. 45 shows a developer carrier having a plurality of floating electrodes constructed in accordance with another embodiment of the present invention. As shown, the developer carrier of this embodiment includes a columnar support 44 of an electrically conductive material, such as aluminum and stainless steel, and an end rotating shaft 44*a* is fixedly provided at each end of the columnar support 44. Around the outer peripheral surface of the columnar support 44 is provided with an elastic magnet layer 45 which is formed by first depositing a composite material including an elastomer, such as chlorinated polyethylene, and a magnetic material, such as ferrite, and then having the thus deposited composite material magnetized. In this magnetization, N and S poles are alternately magnetized along the circumferential direction at a predetermined pitch. With the provision of such an elastic magnetic layer 45 made from an elastomer, excellent elasticity is attained and manufactuability is enhanced with a possible reduction in the number of steps in a manufacturing process. In particular, when use is made of chlorinated polyethylene as in the present embodiment, since it is a halogen-family polymer containing no double bond in the main chain, such advantages as weather-resistance, ozone-resistance, chemical-resistance, oil-resistance, heat-resistance and fire-retardant characteristic may be obtained so that this material is particularly suited for use as a material for forming various components of an electrophotographic copying machine.

On the elastic magnetic layer 5 is formed an electrode layer 4 comprised of a plurality of semispherical electrode particles 2*a* provided as partly embedded and electrically isolated from one another in a dielectric adhesive agent 2*b*. As shown, the electrode particles 2*a* are arranged as exposed at the outer peripheral surface of the electrode layer 2 in an electrically floating state. In the illustrated embodiment, similarly with the previous cases, the electrode particles 2*a* are comprised of copper and the adhesive agent 2*b* is acrylicurethane. It is to be noted that all of the electrode particles 2*a* are provided to be in contact with the outer peripheral surface of the underlying elastic magnetic layer 45 so that the thickness $t_2$ of the electrode layer 2 is equal to the embedded depth $t_{2a}$ of each of the particles 2*a*. As described in detail before, if the particles 2*a* have the diameter ranging from 74 to 104 microns, the thickness $t_2$ must be controlled to range between 52 and 62 microns.

In the developer carrier thus fabricated, it is to be noted that a means for producing a magnetic field, or magnetic poles in the present case, is integrally formed in the underlying layer 45, so that incorporation of this developer carrier into a developing device may be carried out easily and smoothly because there is no need to provide a separate magnet roll in this case. Besides, use of a composite material including elastomer and magnetic powder to form the underlying layer 45 allows to provide a sufficient elasticity, which is advantageous when some elements are brought into pressure contact with the present developer carrier in use condition, and to make the whole structure light in weight.

Figure 46:
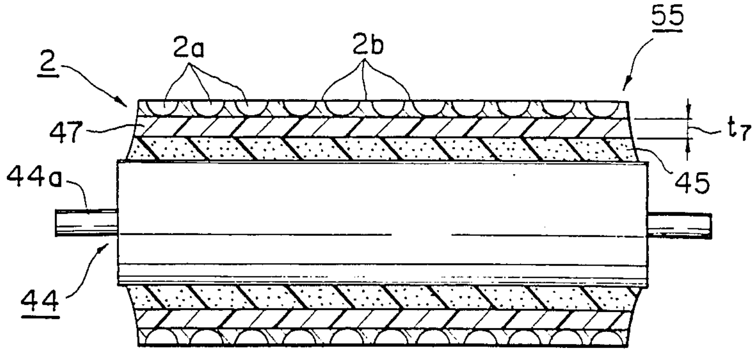

FIG. 46 shows a modified structure which includes an intermediate layer 47 of dielectric material as sandwiched between the elastic magnetic layer 45 and the electrode layer 2. As a further alternative, the layer 47 may be formed on the columnar support 44 with the elastic magnet layer 45 formed as sandwiched between the layer 47 on the columnar support 44 and the electrode layer 2.

Figure 47:
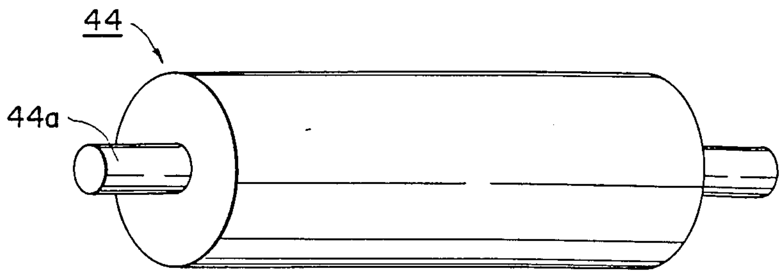
FIGS. 47 through 60 are schematic illustrations showing various steps of a process for forming the developer carrier shown in FIG. 45 in accordance with a further embodiment of the present invention.

It will now be described as to a process for manufacturing the developer carrier illustrated in FIG. 46 according to one embodiment of the present invention. In the first place, as shown in FIG. 47, there is prepared a columnar support 44 which is made from an electrically conductive material in the form of a roll and which is provided with a pair of rotating end shafts 44*a* on both ends. Then, after cleaning the outer peripheral surface of the columnar support 44, the elastic magnet layer 45 is formed.

Figure 48A:
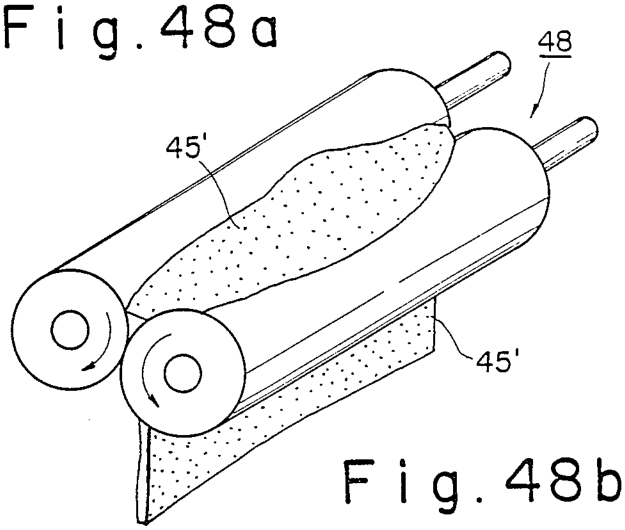
Figure 48B:
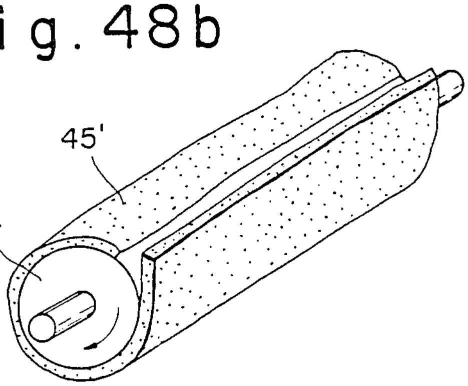
Figure 48C:
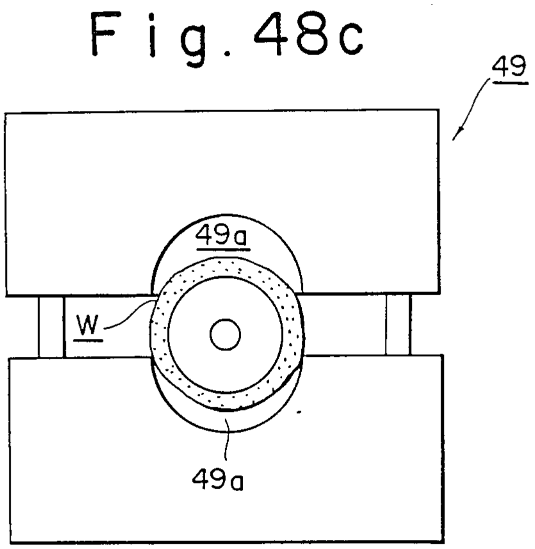
Figure 49A:
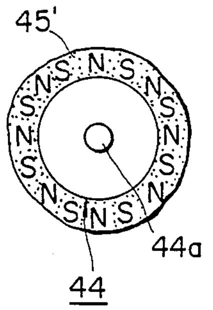
Figure 49B:
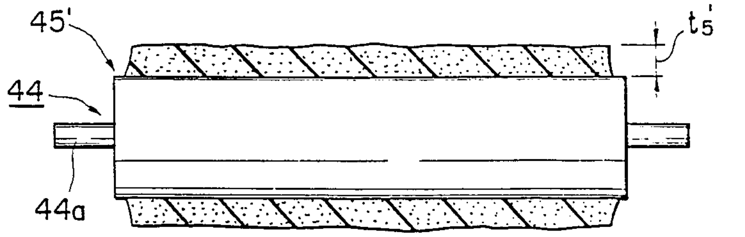

The preferred step of forming the elastic magnet layer 45 on the columnar support 44 is illustrated in FIGS. 48*a* and 48*b*. As shown, there is prepared a composite material 45' which is a mixture of an elastomer, such as chlorinated polyethylene, and a magnetic material, such as ferrite, with an additive, such as a curing agent, if desired. After mixing, the composite material 45' is passed through a pair of mixing rollers 48, 48 arranged side-by-side as shown in FIG. 48*a*. When passed between the pair of mixing rollers 48, 48, there is obtained a sheet of composite material 45', which is well mixed and uniform in composition. This sheet of composite material 45' is then placed around the columnar support 44 as shown in FIG. 48*b*, and, then, the columnar support 44 wrapped with the sheet of composite material 45' is placed in a mold cavity 49*a* defined between a pair of upper and lower mold halves 49 of a press machine. Under the condition, while clamping the mold halves 49 to apply a pressure force onto the sheet of composite material 45', heat is also applied to have the composite material 45' cured. As a result, there is obtained a to-be-formed elastic magnet layer 45' substantially uniform in thickness $t_5'$ across the entire peripheral surface of the columnar support 44, as shown in FIG. 49*b*. Thereafter, any known method may be applied to magnetize the to-be-formed elastic magnet layer 45' in a desired pattern. In the preferred embodiment, the layer 45' is magnetized alternately opposite in polarity at a predetermined pitch along the circumferential direction, as shown in FIG. 49*a*.

Figure 50:
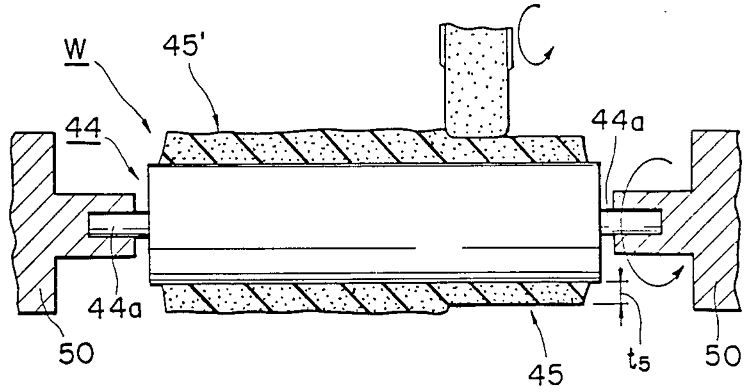

Then, the layer 45' is subjected to surface processing, for example, by employing a cylindrical grinder as shown in FIG. 50 thereby removing the surface portion to define the elastic magnet layer 45 of thickness $t_5$, for example, ranging between 3 and 5 mm. In the illustrated example, the end rotating shafts 44*a*, 44*a* are supported by a pair of holders 50, 50 of a cylindrical grinder to define the intended elastic magnet layer 45.

Figure 51:
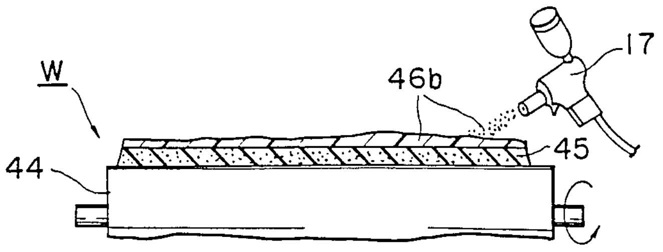
Figure 52:
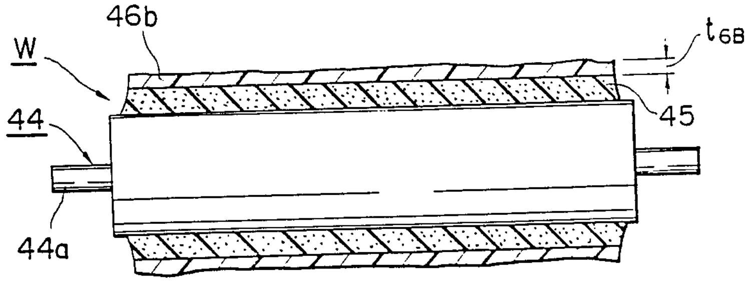

Upon formation of the elastic magnet layer 45, its outer peripheral surface is cleaned and then a first adhesive agent 46*b* of dielectric material, such as acrylicurethane, is uniformly sprayed onto the outer peripheral surface of the elastic magnet layer 45 by means of a compressed air spray type applicator 17, as shown in FIG. 51. There is thus formed a film of first adhesive agent 46*b* covering the elastic magnet layer 45 as shown in FIG. 52 to a predetermined thickness $t_{6B}$, which is, for example, preferably set in a range between approximately 3 and 15 microns in the case where electrode particles 2*a* to be applied in the next following step have the diameter ranging between 74 and 104 microns. In implementing this step, the workpiece W is horizontally and rotatably supported and it is set in rotation at a predetermined speed while moving the applicator 17 along the lengthwise direction of the workpiece W in a reciprocating manner to apply the first adhesive agent 46*b*, which allows to form a film of first adhesive agent 46*b* on the outer peripheral surface of the elastic magnet layer 45 substantially uniformly across the entire region.

Figure 53:
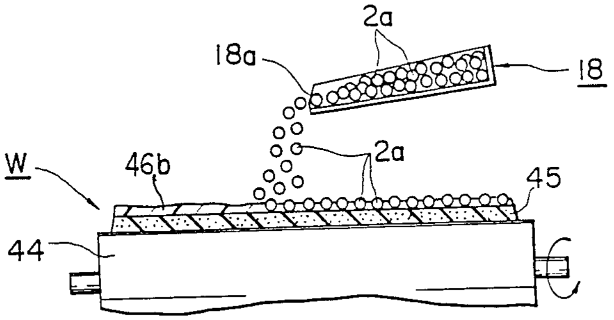
Figure 54:
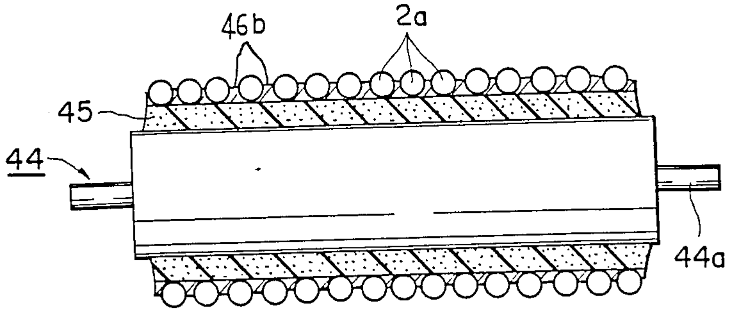

As soon as the film of first adhesive agent 46*b* has been formed, a number of electrode particles 2*a*, each of which is preferably comprised of a spherical particle of an electrically conductive material, such as copper, which is coated with an electrically insulating material, such as styrenebutylacrylate and methylmetacrylate, as described previously, are applied onto the film of first adhesive agent 46*b* before it hardens, as shown in FIG. 53. Similarly as described with respect to the previous embodiments, a quantity of the electrode particles 2*a* having the diameter ranging from 74 to 104 microns are stored in a container 18 provided with a supply port 18*a* and the container 18 is moved as inclined along the workpiece W in a reciprocating manner while keeping the workpiece W in rotation so that the electrode particles 2*a* may fall by their own weight to be deposited onto the film of first adhesive agent 46*b* uniformly. Since the film of first adhesive agent 46*b* is relatively thin, i.e., 3 to 15 microns in the illustrated example, all of the electrode particles 2*a* deposited come to be in contact with the outer peripheral surface of the elastic magnet layer 45 as shown in FIG. 54. Although copper is used in forming the electrode particles 2*a* in the illustrated embodiment, use may also be made of other appropriate materials, such as bronze, phosphor bronze and stainless steel. It is to be noted, however, that the thickness of the film of first adhesive agent 46*b* must be suitably determined depending on the size and specific weight of a material used for forming the electrode particles 2*a* such that they come to be properly in contact with the outer peripheral surface of the elastic magnet layer 45 when deposited onto the film of first adhesive agent 46*b*.

Figure 55:
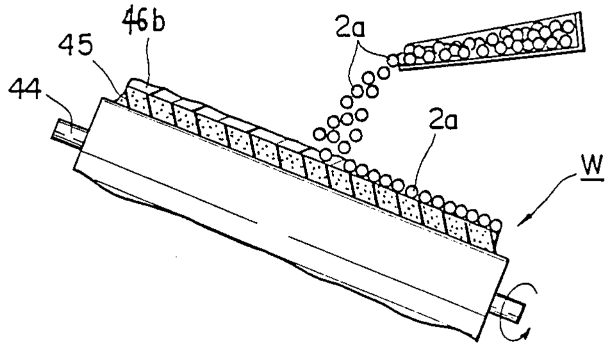
Figure 56:
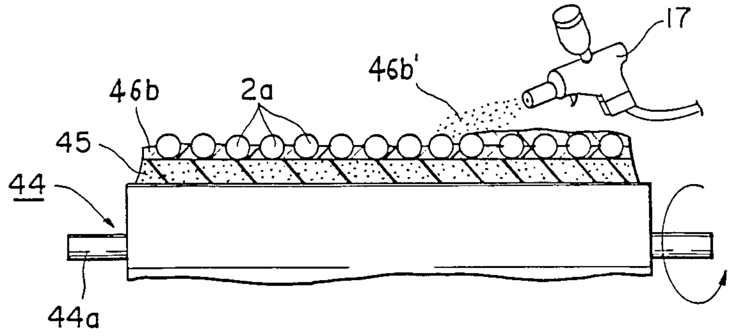
Figure 57:
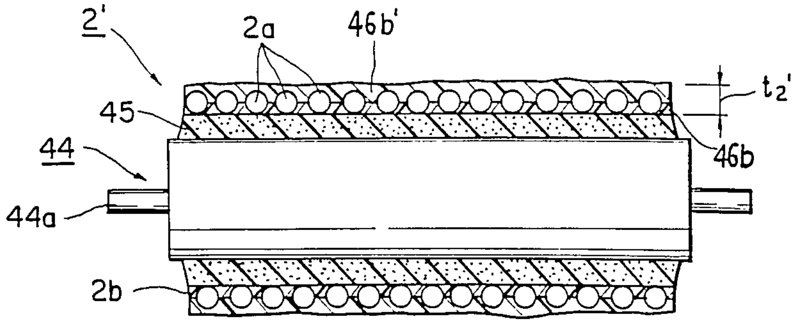

FIG. 55 shows an alternative method for applying the electrode particles 2*a* onto the workpiece W upon formation of the film of first adhesive agent **46*b*. In this case, the workpiece W is maintained inclined at a predetermined angle with respect to the horizontal line instead of horizontal orientation as shown in FIG. 53. If the electrode particles 2*a* are applied as falling from the container under the influence of gravity with the workpiece W maintained in rotation and at an angle with respect to the horizontal line, the electrode particles 2*a* may be deposited on the workpiece W more densely. As mentioned previously, even if adjacent ones of the electrode particles 2*a*** thus deposited are in contact to each other, no particular problem arises because they are coated with an electrically insulating material thereby permitting them to remain electrically isolated from one another.

After deposition of the electrode particles **2*a*, the film of first adhesive agent 46*b*** is hardened substantially completely. In order to expedite this drying or hardening step, it is preferable to apply heat to the workpiece W, for example, by using an far-infrared light heater, by directing a flow of heated air or placing in an electrical furnace. It is to be noted that heating is not always required in the present process. For example, if use is made of a fast-drying type adhesive agent, it may harden quick enough just by leaving it alone or directing a flow of air.

Upon hardening the film of first adhesive agent **46*b* substantially completely, a second adhesive agent 46*b*′ of dielectric material is applied to the workpiece W in a manner similar to the previous step of applying the first adhesive agent 46*b* thereby forming an overcoating film of second adhesive agent 46*b*′ which covers the film of first adhesive agent 46*b* and the electrode particles 2*a* partially embedded in the film of first adhesive agent 46*b*. Preferably, th first and second adhesive agents are identical, but they may be different as long as they can stick together securely. As mentioned previously, with such a two-step structure in application of adhesive agent, it can be insured that all of the electrode particles 2*a* are properly positioned to be in contact with the outer peripheral surface of the elastic magnet layer 45**.

When the film of second adhesive agent **46*b*′ is formed, this film is dried and hardened substantially completely. Also in this step, the workpiece W is preferably maintained in rotation at least until the second adhesive agent 46*b*′ hardens substantially If desired, any appropriate hardening expediting method, such as heating and blowing, may also be applied. As a result, on the elastic magnet layer 45 is formed a to-be-formed electrode layer 2′, including the film of first adhesive agent 46*b*, electrode particles 2*a* and film of second adhesive agent 46*b*′**, to a thickness $t_2'$ preferably in the order of 150 microns in the illustrated embodiment.

Figure 58:
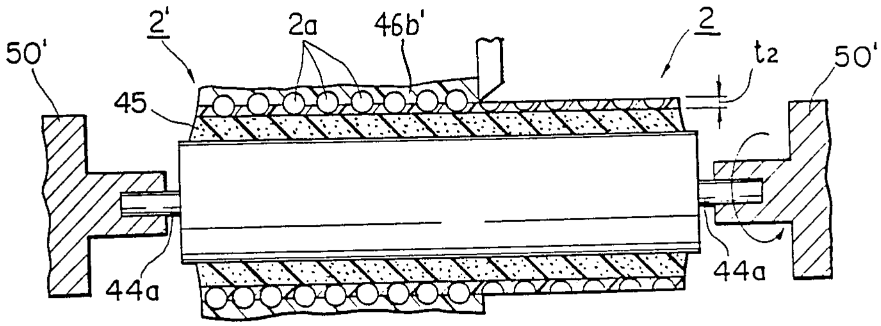

Then, as shown in FIG. 58, the surface portion of the to-be-formed electrode layer 2′ is removed by subjecting the workpiece W to a surface processing operation thereby forming an electrode layer 2 to define a final outer peripheral surface in which the electrode particles **2*a* embedded in the to-be-formed electrode layer 2′ is exposed partly in the form of isolated dots. As described previously, the thickness $t_2$ of electrode layer 2 is required to fall in a predetermined range of 52 to 62 microns, and such a requirement may be met easily in this embodiment because the workpiece W is provided with a pair of integrally provided end rotating shafts 44*a*, 44*a*, which may be grabbed by holders 50′, 50′, such as chucks of a lathe, as shown in FIG. 58. It is to be noted, however, that any other surface processing methods, such as superfinishing method and centerless grinding method, may also be employed to remove the surface portion of the to-be-formed electrode layer 2′ to form the electrode layer 2**.

Upon completion of the step of surface processing as shown in FIG. 58, there is obtained a final product of developer carrier after cleaning to remove chips and cutting oil.

In the above-described embodiment, a step of magnetizing the composite layer 45′ is carried out immediately after formation of the composite layer 45′. It is to be noted, however, that this magnetization step may alternatively be carried out upon completion of surface processing of the composite layer 45′, or upon hardening of the second adhesive agent **46*b*′, or upon completion of surface processing of the to-be-formed electrode layer 2′. However, considering the fact that dust and debris may become easily attached after magnetization, which then could cause scars on the outer peripheral surface it is preferable to carry out this magnetization step after hardening of the second adhesive agent 46*b*′**.

Now, a description will be had as to a process for manufacturing a developer carrier having an intermediate dielectric layer shown in FIG. 46 according to one embodiment of the present invention. This process is very similar to the above-described process for manufacturing a developer carrier shown in FIG. 45 in many respects excepting that this process additionally includes a step of forming the dielectric layer 47 after formation of the composite layer 45, magnetized or not depending on a selected embodiment.

Figure 59:
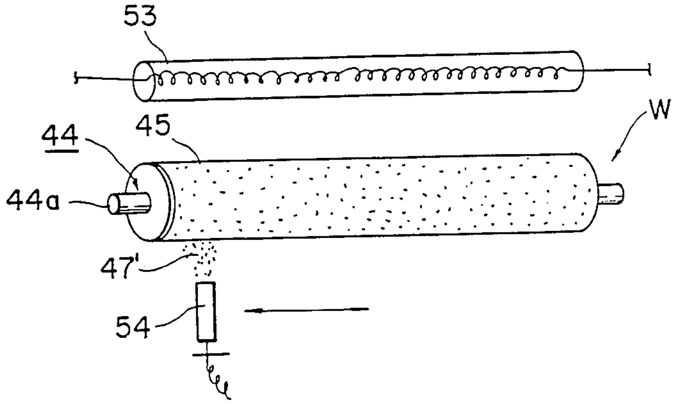
Figure 60:
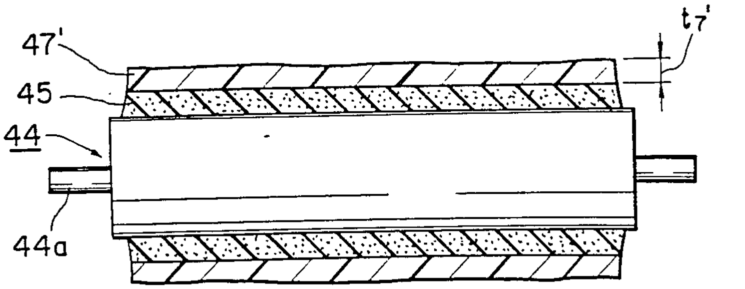

In forming the dielectric layer 47, the workpiece W having the composite layer 45 is set in rotation as maintaining it horizontally and heated, for example, by a far-infrared light heater 53, as shown in FIG. 59. Under the condition, dielectric powder 47′, for example, of epoxy resin is applied from a spray gun 54 to the workpiece W to be deposited onto the composite layer 45, for example, by using the electrostatic spraying or painting method. In this instance, the workpiece W must be maintained at a temperature, which is the melting point of the dielectric powder 47′ or higher, and, this temperature may be preferably set approximately at 180° C. in the present embodiment since use is made of epoxy resin powder. As shown in FIG. 59, it is preferably so structured that the spray gun 54 moves along the lengthwise direction of the workpiece W in a reciprocating manner, in which case the dielectric powder 47′ may be applied to the workpiece W repetitively thereby allowing to form a layer of deposited dielectric powder uniform in thickness and composition.

When the dielectric powder 47′ has been deposited by a sufficient amount, spraying of dielectric powder 47′ is terminated, but the workpiece W is continuously maintained in rotation as well as in heating for a predetermined time period at least until the deposited dielectric material hardens sufficiently. In this manner, there is formed a to-be-formed dielectric layer 47′ which is substantially uniform in thickness not only in the lengthwise direction but also in the circumferential direction. Then, similarly with the step of surface processing the composite layer 45, the surface portion of the to-be-formed dielectric layer 47′ is removed by any well-known surface processing method, such as using a lathe or cylindrical grinder, thereby forming the desired dielectric layer 47 having a predetermined thickness $t_7$, which is uniform across the entire region.

Thereafter, similarly with the previously described embodiment, the electrode layer 2 is formed on the dielectric layer 47 to result in the structure shown in FIG. 46. It is to be noted that the surface processing of the composite layer 45 may be omitted in the present embodiment, if its outer peripheral surface is sufficiently smooth when this layer 45 has been formed by press molding.

While the above provides a full and complete disclosure of the preferred embodiments of the present invention, various modifications, alternate constructions and equivalents may be employed without departing from the true spirit and scope of the invention. For example, the application of adhesive agent may be carried out by any other methods including a dipping method. Therefore, the above description and illustration should not be construed as limiting the scope of the invention, which is defined by the appended claims.

What is claimed is:

1. A developer carrier for use in a developing device, comprising:

an electrically conductive support;

a first layer of composite material formed on said support, said composite material including at least an elastic material and a magnetic material so that said first layer is magnetized in alternating polarities at a . predetermined pitch; and a second layer formed on said first layer, said second layer including a dielectric material and a plurality of electrode particles which are embedded in said second layer as electrically isolated from one another and each partly exposed at an outer surface of said second layer.

2. The developer carrier of claim 1 wherein said support is columnar in shape.

3. The developer carrier of claim 2 wherein said elastic material is an elastomer.

4. The developer carrier of claim 3 wherein said elastomer is a halogen-family polymer having no double bond in its main chain.

5. The developer carrier of claim 4 wherein said halogen-family polymer is chlorinated polyethylene.

6. The developer carrier of claim 2 wherein said columnar support is integrally provided with an end shaft at each end.

7. The developer carrier of claim 1 further comprising an intermediate layer sandwiched between said first and second layers.

8. The developer carrier of claim 7 wherein said intermediate layer is comprised of an elastic, dielectric material.

9. The developer carrier of claim 8 wherein said elastic, dielectric material is rubber.

10. The developer carrier of claim 1, wherein said magnetic material is ferrite.

* * * * *